United States Patent
Wang et al.

(10) Patent No.: US 11,627,500 B2
(45) Date of Patent: Apr. 11, 2023

(54) RECEIVER PROTECTION IN SIDELINK WIRELESS SYSTEMS

(71) Applicant: QUALCOMM Incorporated, San Diego, CA (US)

(72) Inventors: Xiaojie Wang, Hillsborough, NJ (US); Jing Sun, San Diego, CA (US); Junyi Li, Franklin Park, NJ (US); Piyush Gupta, Bridgewater, NJ (US); Jung Ho Ryu, Fort Lee, NJ (US); Sony Akkarakaran, Poway, CA (US); Arumugam Chendamarai Kannan, San Diego, CA (US); Xiaoxia Zhang, San Diego, CA (US); Tao Luo, San Diego, CA (US); Juan Montojo, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/125,985

(22) Filed: Dec. 17, 2020

(65) Prior Publication Data
US 2022/0201557 A1 Jun. 23, 2022

(51) Int. Cl.
*H04W 28/26* (2009.01)
*H04W 72/02* (2009.01)
(Continued)

(52) U.S. Cl.
CPC .......... *H04W 28/26* (2013.01); *H04W 72/02* (2013.01); *H04W 72/0406* (2013.01); *H04W 72/0446* (2013.01); *H04W 72/0453* (2013.01)

(58) Field of Classification Search
CPC . H04W 28/26; H04W 72/02; H04W 72/0406; H04W 72/0446; H04W 72/0453
See application file for complete search history.

(56) References Cited

U.S. PATENT DOCUMENTS

2021/0337512 A1* 10/2021 Belleschi ................ H04W 4/40
2021/0392707 A1* 12/2021 Do ........................ H04W 76/14
(Continued)

OTHER PUBLICATIONS

Apple: "On Remaining Details of NR V2X Physical Layer Structure", 3GPP Draft, 3GPP TSG Ran WG1 #100bis, R1-2002323, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 11, 2020 (Apr. 11, 2020), pp. 1-10, XP051875543, Retrieved from the Internet: URL: https://ftp.3gpp.org/tsg_ran/WG1_RL1/TSGR1_100b_e/Docs/R1-2002323.zip. R1-2002323, On Remaining Details of NR V2X Physical Layer Structure.docx [Retrieved on Apr. 11, 2020] section 2.1, paragraph [02.4].
(Continued)

*Primary Examiner* — Raj Jain
(74) *Attorney, Agent, or Firm* — Holland & Hart LLP

(57) ABSTRACT

Methods, systems, and devices for wireless communications are described. In some cases, a first user equipment (UE) may receive a control message from a second UE indicating resources that are reserved for communications between the first UE and the second UE. The first UE may transmit a first control message and a second control message for reassurance of the reserved resources. The first UE may transmit a first control message for reservation reassurance, and the first control message may indicate a resource configuration for a second control message for reservation reassurance. The first UE may transmit an indication of the reserved resources, resource reservation reassurance information, or both via the second control message. A third UE may receive the first and second control messages and may refrain from communicating on the reserved resources based on the indication.

30 Claims, 16 Drawing Sheets

(51) Int. Cl.
  *H04W 72/04* (2009.01)
  *H04W 72/0446* (2023.01)
  *H04W 72/0453* (2023.01)

(56) References Cited

U.S. PATENT DOCUMENTS

2021/0410114 A1* 12/2021 Lee .................. H04W 4/40
2022/0070925 A1* 3/2022 Liu .................. H04W 72/10
2022/0201557 A1* 6/2022 Wang ............... H04W 72/0406

OTHER PUBLICATIONS

Fraunhofer Hhi, et al., "Resource Allocation Enhancements for Mode 2", 3GPP Draft, R1-2008757, 3GPP TSG RAN WG1 Meeting #103-e, 3rd Generation Partnership Project (3GPP), Mobile Competence Centre, 650, Route Des Lucioles, F-06921 Sophia-Antipolis Cedex, France, vol. RAN WG1 RAN WG1, No. e-Meeting, Oct. 26, 2020-Nov. 13, 2020, Oct. 23, 2020 (Oct. 23, 2020), XP051945369, 7 Pages, Retrieved from the Internet: URL: https://ftp.3gpp.org/tsg_ran/WG1_RL1/TSGR1_103-e/Docs/R1-2008757.zip R1-2008757_SL_RA_M2enh.docx [retrieved on Oct. 23, 2020] paragraph [0002].
Lenovo, et al., "Sidelink Physical Layer Structures in NR V2X", 3GPP Draft, R1-1910144, 3GPP TSG RAN WG1 #98bis, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051788951, 6 Pages, Retrieved from the Internet: URL: http://www.3gpp.org/ftp/tsg_ran/WG1_RL1/TSGR1_98b/Docs/R1-1910144.zip [retrieved on Oct. 5, 2019] paragraph [0002]-paragraph [0004].
Nokia, et al., "Discussion of Physical Layer Structure for Sidelink", 3GPP Draft, 3GPP TSG RAN WG1 #98bis, R1-1910512-NOKIA-5G V2X NRSL—Discussion of Physical Layer Structure for Sidelink, 3rd Generation Partnership Project (3GPP), Mobile Competence Centre, 650, Route Des Lucioles, F-06921, Sophia-Antipolis Cedex, France, vol. RAN WG1. No. Chongqing, China, Oct. 14, 2019-Oct. 20, 2019, Oct. 8, 2019 (Oct. 8, 2019), XP051809140, 16 pages, Retrieved from the Internet: URL: https://ftp.3gpp.org/tsg_ran/WG1_RL1/TSGR1_98b/Docs/R1-1910512.zip R1-1910512-Nokia-5G V2X NRSL—Discussion of physical layer structure for sidelink.docx [retrieved on Oct. 8, 2019] p. 4 p. 5-p. 6, table 1, paragraph [02.2].
OPPO: "Inter-UE Coordination in Mode 2 of NR Sidelink", 3GPP Draft, R1-2009319, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 26, 2020 (Oct. 26, 2020), XP051947523, 8 Pages, Retrieved from the Internet: URL: https://ftp.3gpp.org/tsg_ran/WG1_RL1/TSGR1_103-e/Docs/R1-2009319.zip R1-2009319_0PPO_mode 2 enhancement. docx [retrieved on Oct. 26, 2020] paragraph [0002].
Partial International Search Report—PCT/US2021/072057—ISA/EPO—dated Mar. 25, 2022.
International Search Report and Written Opinion—PCT/US2021/072057—ISA/EPO—dated May 16, 2022.

* cited by examiner

405 First Stage SCI Resources

410 Second Stage SCI Resources

415 Feedback Channel Resources

RECEIVER PROTECTION IN SIDELINK WIRELESS SYSTEMS

FIELD OF TECHNOLOGY

The following relates to wireless communications, including receiver protection in sidelink wireless systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may broadcast a control message to neighboring devices to indicate resources that are reserved for transmissions by the UE. In some cases, a neighboring device may not receive the control message from the UE (e.g., due to a duplexing mode of the neighboring UE, interference in the communication link between the UEs, beam sweeping, or the like). If the neighboring UE fails to receive and decode the control message, the neighboring UE may not receive the indication of the resource reservation, and may communicate using the reserved resources, which may cause interference, reduce throughput, and increasing overhead, among other issues.

SUMMARY

The described techniques relate to improved methods, systems, devices, and apparatuses that support receiver protection in sidelink wireless systems. Generally, the described techniques provide for a user equipment (UE) to receive an indication of resources reserved for transmissions to the UE and retransmit the indication of the reserved resources to one or more other UEs for reservation reassurance. For example, a first UE (e.g., a transmitting UE) may transmit a control message to a second UE (e.g., a receiving UE) and one or more other UEs. The control message may indicate resources that are reserved for future communications between the first UE and the second UE.

The second UE may transmit sidelink control information (SCI) to repeat the indication of the reserved resources to one or more other UEs for reservation reassurance. For example, the second UE may transmit a first stage SCI that may indicate a resource configuration for a second stage SCI for resource reservation reassurance. In some examples, the first stage SCI may include reservation reassurance information. The second UE may transmit the second stage SCI including an indication of the reserved resources, resource reservation reassurance information, or both. The second UE may transmit the first stage SCI and the second stage SCI in a broadcast, groupcast, unicast, or any combination thereof transmission to one or more other UEs. In some cases, the second UE may negotiate a transmission occasion for transmitting the first stage SCI and second stage SCI with a transmitting UE, such as the first UE, the second UE may transmit the first stage SCI and the second stage SCI periodically, or the second UE may detect interference in the reserved resources and transmit the first stage SCI and the second stage SCI based on the detected interference. A third UE may receive the first stage SCI and the second stage SCI, and the third UE may refrain from scheduling communications on the reserved resources based on the control messages (e.g., first and second stage SCI). By performing resource reservation reassurance, the second UE may improve coordination between devices and reduce interference in a wireless communications system.

A method for wireless communications at a first UE is described. The method may include receiving, from a second UE, an indication of a set of reserved resources for sidelink communications between the first UE and the second UE, transmitting, based on the indication of the set of reserved resources, a first control message for reservation reassurance of the set of reserved resources, the first control message including an indication of a resource configuration for a second control message for reservation reassurance of the set of reserved resources, and transmitting the second control message based on the indication of the resource configuration, the second control message indicating the set of reserved resources for sidelink communications between the first UE and the second UE.

An apparatus for wireless communications at a first UE is described. The apparatus may include a processor, memory in electronic communication with the processor, and instructions stored in the memory. The instructions may be executable by the processor to cause the apparatus to receive, from a second UE, an indication of a set of reserved resources for sidelink communications between the first UE and the second UE, transmit, based on the indication of the set of reserved resources, a first control message for reservation reassurance of the set of reserved resources, the first control message including an indication of a resource configuration for a second control message for reservation reassurance of the set of reserved resources, and transmit the second control message based on the indication of the resource configuration, the second control message indicating the set of reserved resources for sidelink communications between the first UE and the second UE.

Another apparatus for wireless communications at a first UE is described. The apparatus may include means for receiving, from a second UE, an indication of a set of reserved resources for sidelink communications between the first UE and the second UE, means for transmitting, based on the indication of the set of reserved resources, a first control message for reservation reassurance of the set of reserved resources, the first control message including an indication of a resource configuration for a second control message for reservation reassurance of the set of reserved resources, and means for transmitting the second control message based on the indication of the resource configuration, the second control message indicating the set of reserved resources for sidelink communications between the first UE and the second UE.

A non-transitory computer-readable medium storing code for wireless communications at a first UE is described. The code may include instructions executable by a processor to receive, from a second UE, an indication of a set of reserved resources for sidelink communications between the first UE and the second UE, transmit, based on the indication of the set of reserved resources, a first control message for reservation reassurance of the set of reserved resources, the first control message including an indication of a resource configuration for a second control message for reservation reassurance of the set of reserved resources, and transmit the second control message based on the indication of the resource configuration, the second control message indicating the set of reserved resources for sidelink communications between the first UE and the second UE.

Some examples of the method, apparatuses, and non-transitory computer-readable medium described herein may further include operations, features, means, or instructions for transmitting an indication of a format of the second control message in the first control message.

Some examples of the method, apparatuses, and non-transitory computer-readable medium described herein may further include operations, features, means, or instructions for transmitting the indication of the format of the second control message in a first field of the first control message and transmitting the indication of the resource configuration for the second control message in one or more other fields of the first control message.

In some examples of the method, apparatuses, and non-transitory computer-readable medium described herein, the format of the second control message may be a configured format for reservation reassurance, the configured format may be associated with one or more types of reservation reassurance information for the set of reserved resources, and the resource configuration may be based on a number of the one or more types of the reservation reassurance information.

In some examples of the method, apparatuses, and non-transitory computer-readable medium described herein, the one or more types of the reservation reassurance information include a source identifier (ID), a destination ID, a reservation reassurance indication, a recommended resource indication, a sensing report, or a combination thereof.

In some examples of the method, apparatuses, and non-transitory computer-readable medium described herein, the configured format for reservation reassurance indicates that the number of the one or more types of the reservation reassurance information may be a configured number.

Some examples of the method, apparatuses, and non-transitory computer-readable medium described herein may further include operations, features, means, or instructions for transmitting, in one or more fields in the first control message, the resource configuration and an indication of the number of the one or more types of the reservation reassurance information.

Some examples of the method, apparatuses, and non-transitory computer-readable medium described herein may further include operations, features, means, or instructions for configuring one or more fields of the first control message for reservation reassurance and transmitting reservation reassurance information in the one or more fields of the first control message.

Some examples of the method, apparatuses, and non-transitory computer-readable medium described herein may further include operations, features, means, or instructions for transmitting a second set of resources for a sidelink data channel in the second control message and transmitting reservation reassurance information for the set of reserved resources in the second set of resources for the sidelink data channel.

Some examples of the method, apparatuses, and non-transitory computer-readable medium described herein may further include operations, features, means, or instructions for transmitting the first control message and the second control message according to a configured periodicity, the first control message or the second control message indicating the configured periodicity.

Some examples of the method, apparatuses, and non-transitory computer-readable medium described herein may further include operations, features, means, or instructions for detecting interference on the set of reserved resources and transmitting the indication of the set of reserved resources based on detecting the interference.

Some examples of the method, apparatuses, and non-transitory computer-readable medium described herein may further include operations, features, means, or instructions for determining a transmission occasion for transmitting the first control message and the second control message based on a negotiation procedure with the second UE or a third UE.

Some examples of the method, apparatuses, and non-transitory computer-readable medium described herein may further include operations, features, means, or instructions for transmitting the first control message and the second control message using a same beam.

Some examples of the method, apparatuses, and non-transitory computer-readable medium described herein may further include operations, features, means, or instructions for detecting interference in the set of reserved resources during a time period and transmitting the first control message and the second control message using multiple beams according to a beam sweeping procedure based on the detected interference.

A method for wireless communications at a first UE is described. The method may include receiving, from a second UE, a first control message including an indication of a resource configuration for a second control message, monitoring for the second control message from the second UE based on the indication of the resource configuration, the second control message including an indication of a set of reserved resources for communications associated with the second UE, and determining resources for communications by the first UE based on the indication of the set of reserved resources, where the resources for communications by the first UE are nonoverlapping with the set of reserved resources for communications associated with the second UE.

An apparatus for wireless communications at a first UE is described. The apparatus may include a processor, memory in electronic communication with the processor, and instructions stored in the memory. The instructions may be executable by the processor to cause the apparatus to receive, from a second UE, a first control message including an indication of a resource configuration for a second control message, monitor for the second control message from the second UE based on the indication of the resource configuration, the second control message including an indication of a set of reserved resources for communications associated with the second UE, and determine resources for communications by the first UE based on the indication of the set of reserved resources, where the resources for communications by the first UE are nonoverlapping with the set of reserved resources for communications associated with the second UE.

Another apparatus for wireless communications at a first UE is described. The apparatus may include means for receiving, from a second UE, a first control message including an indication of a resource configuration for a second control message, means for monitoring for the second control message from the second UE based on the indication of the resource configuration, the second control message including an indication of a set of reserved resources for communications associated with the second UE, and means for determining resources for communications by the first UE based on the indication of the set of reserved resources, where the resources for communications by the first UE are nonoverlapping with the set of reserved resources for communications associated with the second UE.

A non-transitory computer-readable medium storing code for wireless communications at a first UE is described. The code may include instructions executable by a processor to receive, from a second UE, a first control message including an indication of a resource configuration for a second control message, monitor for the second control message from the second UE based on the indication of the resource configuration, the second control message including an indication of a set of reserved resources for communications associated with the second UE, and determine resources for communications by the first UE based on the indication of the set of reserved resources, where the resources for communications by the first UE are nonoverlapping with the set of reserved resources for communications associated with the second UE.

Some examples of the method, apparatuses, and non-transitory computer-readable medium described herein may further include operations, features, means, or instructions for identifying a format of the second control message based on an indication of the format in the first control message.

Some examples of the method, apparatuses, and non-transitory computer-readable medium described herein may further include operations, features, means, or instructions for identifying the format of the second control message based on a first field in the first control message and identifying the resource configuration for the second control message based on a set of fields different from the first field in the first control message.

Some examples of the method, apparatuses, and non-transitory computer-readable medium described herein may further include operations, features, means, or instructions for determining that the resource configuration for the second control message may be a configured resource configuration based on the format for reservation reassurance.

Some examples of the method, apparatuses, and non-transitory computer-readable medium described herein may further include operations, features, means, or instructions for identifying, based on the format and the resource configuration, a number of types of reservation reassurance information included in the second control message and a number of time and frequency resources for receiving the second control message and receiving the second control message including the indication of the set of reserved resources and the reservation reassurance information based on the identifying.

In some examples of the method, apparatuses, and non-transitory computer-readable medium described herein, the types of the reservation reassurance information include one or more of a source ID, a destination ID, a reservation reassurance indication, a recommended resource indication, a sensing report, or a combination thereof.

In some examples of the method, apparatuses, and non-transitory computer-readable medium described herein, determining the resources for communications by the first UE may include operations, features, means, or instructions for determining the resources for communications by the first UE based on the indication of the set of reserved resources and the reservation reassurance information.

Some examples of the method, apparatuses, and non-transitory computer-readable medium described herein may further include operations, features, means, or instructions for identifying available resources in a subchannel, where the available resources in the subchannel may be nonoverlapping with time and frequency resources for the second control message indicated by the resource configuration and transmitting data in the available resources based on the identifying.

A method for wireless communications at a first UE is described. The method may include determining a set of resources for sidelink communications with a second UE, transmitting a first control message including a first indication of the set of resources, and negotiating, with the second UE, a transmission occasion for resource reservation reassurance, the transmission occasion configured for transmission of a second indication of the set of resources by the second UE.

An apparatus for wireless communications at a first UE is described. The apparatus may include a processor, memory in electronic communication with the processor, and instructions stored in the memory. The instructions may be executable by the processor to cause the apparatus to determine a set of resources for sidelink communications with a second UE, transmit a first control message including a first indication of the set of resources, and negotiate, with the second UE, a transmission occasion for resource reservation reassurance, the transmission occasion configured for transmission of a second indication of the set of resources by the second UE.

Another apparatus for wireless communications at a first UE is described. The apparatus may include means for determining a set of resources for sidelink communications with a second UE, means for transmitting a first control message including a first indication of the set of resources, and means for negotiating, with the second UE, a transmission occasion for resource reservation reassurance, the transmission occasion configured for transmission of a second indication of the set of resources by the second UE.

A non-transitory computer-readable medium storing code for wireless communications at a first UE is described. The code may include instructions executable by a processor to determine a set of resources for sidelink communications with a second UE, transmit a first control message including a first indication of the set of resources, and negotiate, with the second UE, a transmission occasion for resource reservation reassurance, the transmission occasion configured for transmission of a second indication of the set of resources by the second UE.

In some examples of the method, apparatuses, and non-transitory computer-readable medium described herein, the transmission occasion indicates a second set of resources in a subchannel for a second control message including the second indication of the set of reserved resources.

Some examples of the method, apparatuses, and non-transitory computer-readable medium described herein may further include operations, features, means, or instructions for identifying available resources in the subchannel, where the available resources may be nonoverlapping with the second set of resources for the second control message and performing sidelink communications using the available resources.

DETAILED DESCRIPTION

Figure 1:
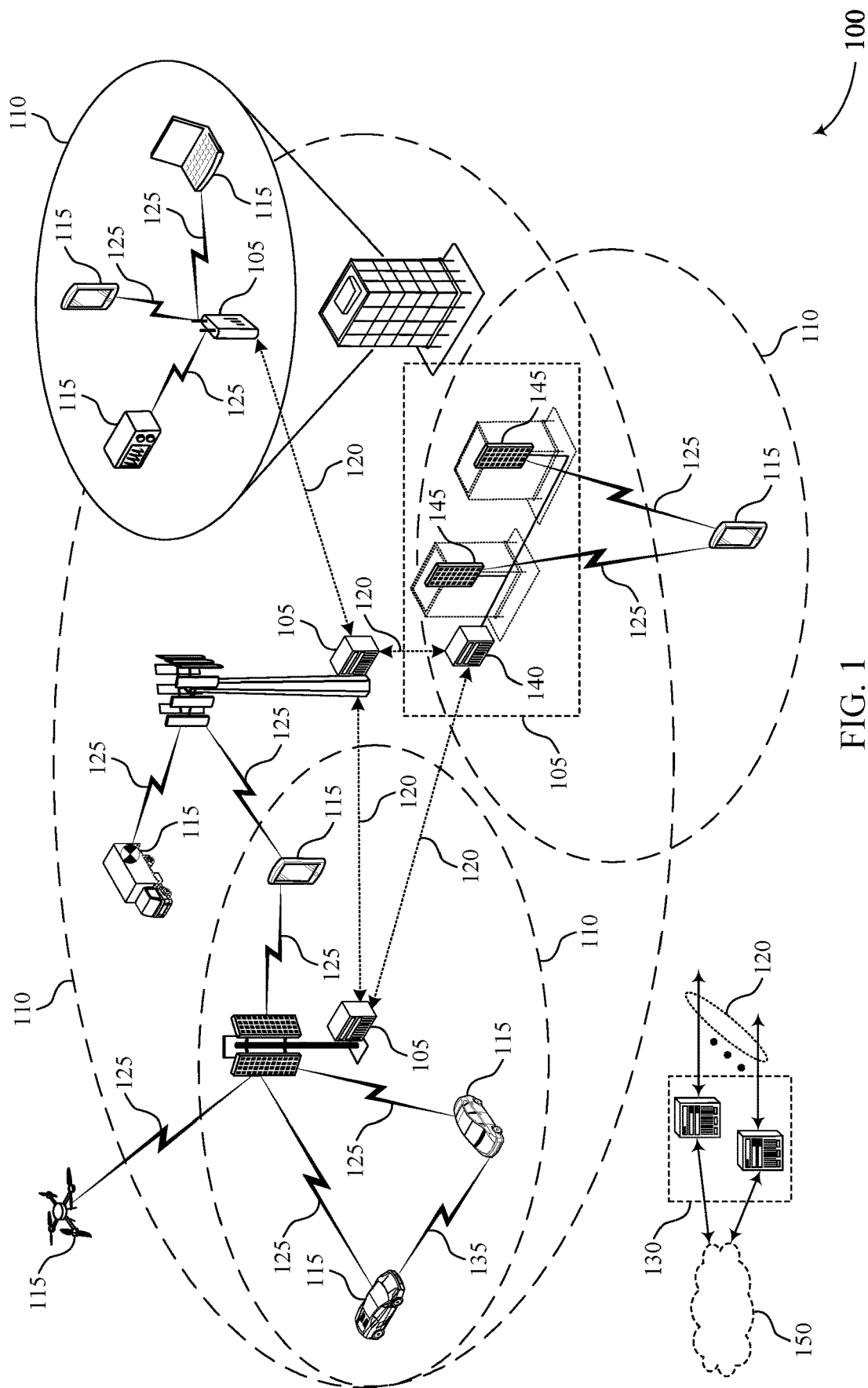
FIG. 1 illustrates an example of a wireless communications system in accordance with aspects of the present disclosure.

In some wireless communications systems, a first user equipment (UE) in the network (e.g., a first transmitting device, such as an anchor, a programmable logic controller (PLC), or some other node) may convey sidelink control information (SCI) to one or more other UEs to indicate resources reserved for communications (e.g., transmissions or retransmissions) by the first UE. For example, the first UE may broadcast a first stage SCI (e.g., SCI-1) to one or more other UEs to indicate resources reserved for communications between the first UE and a second UE (or another wireless device). In some cases, a third UE may fail to receive the first stage SCI (e.g., due to a duplexing mode of the third UE, interference in the communication link between the UEs, beam sweeping, or the like). If the third UE fails to receive and decode the first stage SCI, the third UE may not receive the indication of the resource reservation and may transmit data in the reserved resources, which may interfere with the communications at the first UE.

To reduce interference in the reserved resources, the second UE (e.g., a receiving UE, a client UE, a sensor/actuator (S/A), or some other node) may transmit an indication of the reserved resources for resource reservation reassurance. For example, the second UE may transmit a first control message, a second control message, or both, to indicate the reserved resources, provide resource reservation reassurance information, or both to neighboring UEs that may interfere with the reserved resources. The second UE may transmit a first stage SCI and a second stage SCI for reservation reassurance via the reserved resources, via different resources, or using beam sweeping techniques (e.g., using one or more beams that are different from the reserved resources). The resource reservation reassurance may be broadcast or groupcast to multiple neighboring devices (e.g., UEs), or the resource reservation reassurance may be transmitted in a unicast message to one neighboring UE (e.g., a neighboring UE that may cause interference in the reserved resources, such as the third UE).

The first stage SCI may indicate a resource configuration for the second stage SCI to convey resource reservation reassurance information. In one example, a first field in the first stage SCI (e.g., a SCI-2 format field) may indicate a resource reservation reassurance format for the second stage SCI (e.g., a configured format for performing reservation reassurance). Additionally or alternatively, the format may be indicated via one or more fields in the first stage SCI, a scrambling sequence for the first stage SCI, reserved bits in a control message, radio resource control (RRC) signaling, or the like. In some examples, one or more fields in the first stage SCI may be repurposed for reservation reassurance to include resource reservation reassurance information, an indication of information included in the second stage SCI, or both.

The second stage SCI may include one or more fields for transmitting the indication of the reserved resources and resource reservation reassurance information. For example, the second stage SCI may convey a source ID of the second UE, a destination ID, a cast type, a reservation reassurance indication, a collision indication, a resource recommendation, a sensing report, or a combination thereof. The second stage SCI may occupy a different number of time and frequency resources based on the amount of information conveyed via the second stage SCI. In some examples, the resource reservation reassurance format for the second stage SCI may be associated with a configured amount of information and a configured number of time and frequency resources. Additionally or alternatively, the amount of information and the resource allocation for the second stage SCI may be indicated via the one or more repurposed fields in the first stage SCI, via upper layer signaling (e.g., RRC signaling), or the like. In one example, the second stage SCI may be configured to transmit an amount of resource reservation information below a threshold (or no resource reservation reassurance information) and the resource reservation reassurance information and the indication of the reserved resources may be transmitted via a data channel.

In some examples, the second UE may negotiate a transmission occasion for reservation reassurance with the first UE. Additionally or alternatively, the second UE may transmit the reservation reassurance according to a configured periodicity, or the second UE may detect interference in the reserved resources, and the second UE may transmit the reservation reassurance information based on the detected interference. Transmitting the first control message and the second control message to reassure the reserved resources may improve communications by reducing latency and interference, increasing network throughput, among other benefits.

Aspects of the disclosure are initially described in the context of wireless communications systems. Additional aspects are described in the with reference to beam configurations, resource configurations, and process flows. Aspects of the disclosure are further illustrated by and described with reference to apparatus diagrams, system diagrams, and flowcharts that relate to receiver protection in sidelink wireless systems.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI- RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmissions (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may transmit an indication of resources reserved for transmissions to the UE 115 to reassure the reserved resources. For example, a first UE 115 may transmit a control message indicating resources that are reserved for sidelink communications between the first UE 115 (e.g., a transmitting UE 115) and a second UE 115 (e.g., a receiving UE 115). The second UE 115 may transmit a first control message and a second control message for reassuring the reserved resources. The first control message may be a first stage SCI message that may indicate a resource configuration for a second stage SCI message (e.g., the second control message). In some examples, the first stage SCI may include reservation reassurance information. The second UE 115 may transmit the second stage SCI including an indication of the reserved resources, resource reservation reassurance information, or both. The second UE 115 may transmit the first stage SCI and the second stage SCI to one or more neighboring UEs 115 in a broadcast or unicast transmission. The second UE 115 may negotiate a transmission occasion for transmitting the first stage SCI and second stage SCI with a transmitting UE 115 (e.g., the first UE 115, or some other device). In some examples, the second UE 115 may transmit the first stage SCI and the second stage SCI periodically, or the second UE 115 may detect interference in the reserved resources, and the second UE 115 may transmit the first stage SCI and the second stage SCI based on the detected interference. By transmitting the control messages for reservation reassurance, the second UE 115 may improve coordination between sidelink UEs 115 and reduce interference in the wireless communications system 100.

Figure 2:
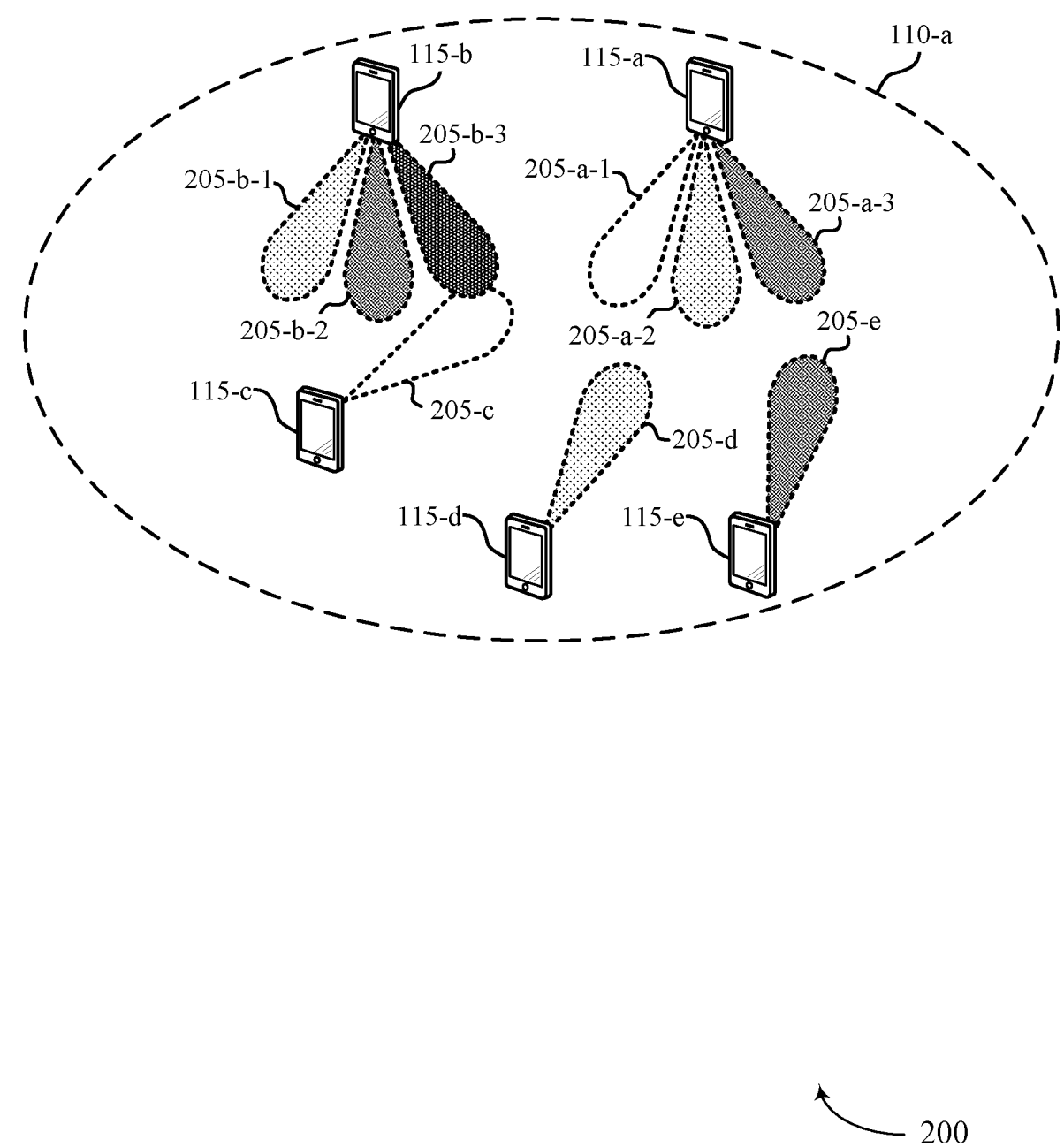
FIG. 2 illustrates an example of a wireless communications system in accordance with aspects of the present disclosure.

FIG. 2 illustrates an example of a wireless communications system 200 in accordance with aspects of the present disclosure. The wireless communications system 200 may include UEs 115-*a*, 115-*b*, 115-*c*, 115-*d*, and 115-*e*, which may be examples of UEs 115 as described with reference to FIG. 1. Additionally or alternatively, UEs 115-*a*, 115-*b*, 115-*c*, 115-*d*, and 115-*e* may be examples of, or may include, a PLC, a S/A (e.g., devices that may support industrial IoT (IIoT) communications), or some other device. The UEs 115 may support sidelink communications within geographic coverage area 110-*a* using transmit and receive beams 205 (e.g., if the wireless communications system 200 is a mmW system), or the UEs 115 may support sidelink communications via sidelink communication links. In some cases, UE 115-*a* may reserve resources for transmissions to UE 115-*c*, and UE 115-*c* may experience interference on the reserved resources due to interfering transmissions by UE 115-*b*. UE 115-*c* may transmit resource reservation reassurance information to reduce interference on the reserved resources.

As illustrated in FIG. 2, UEs 115-*a* and 115-*b* may beamform transmissions to UEs 115-*c*, 115-*d*, and 115-*e* using one or more beams 205-*a* (e.g., beams 205-*a*-1, 205-*a*-2, and 205-*a*-3) and 205-*b* (e.g., beams 205-*b*-1, 205-*b*-2, and 205-*b*-3), respectively. UEs 115-*a* and 115-*b* may sweep beams 205-*a* and 205-*b* in multiple directions to communicate with multiple UEs 115. UEs 115-*c*, 115-*d*, and 115-*e* may monitor for data on beams 205-*c*, 205-*d*, and 205-*e*, respectively. In some systems (e.g., systems using a sub-6 GHz frequency band), the UEs 115 may communicate via communication links, and the UEs 115 may refrain from communicating using the beams 205. In some examples, UEs 115-*a* and 115-*b* may be referred to as transmitting UEs 115 or anchor UEs 115 (e.g., PLCs in an IIoT system). UEs 115-*c*, 115-*d*, and 115-*e* may be referred to as receiving UEs 115 or client UEs 115 (e.g., S/As in an IIoT system).

In some examples (e.g., IIoT systems), each client UE 115 (e.g., each of UEs 115-*c*, 115-*d*, and 115-*e*) may be in communication with one anchor UE 115, and each anchor UE 115 may serve multiple client UEs 115 (e.g., in an IIoT system, a PLC may be in communication with 20 S/As, 50 S/As, or some other number of S/As). For example, client UE 115-*e* may communicate with anchor UE 115-*a* (e.g., client UE 115-*e* may monitor beam 205-*e* for communications from anchor UE 115-*a*), and anchor UE 115-*a* may serve each of client UEs 115-*c*, 115-*d*, 115-*e*, and one or more other client UEs 115. In some examples, the anchor UEs 115 may be configured with more capabilities (e.g., more bandwidth, improved beamforming capabilities, increased processing power, or the like) than the client UEs 115.

In the wireless communications system 200, UE 115-*a* may schedule transmissions to one or more client UEs 115 on sets of reserved resources. UE 115-*a* may broadcast first stage SCI to UEs 115-*b*, 115-*c*, 115-*d*, 115-*e*, and one or more other UEs 115. The first stage SCI may indicate a resource allocation for resources that are reserved for transmissions by UE 115-*a*. For example, the first stage SCI may indicate resources that are reserved for transmissions from UE 115-*a* to UE 115-*c*. The UEs 115 that receive the first stage SCI may identify the reserved resources and refrain from transmitting on the reserved resources to avoid resource collisions.

In some cases, however, a UE 115 may fail to receive or decode the first stage SCI from UE 115-*a*. For example, UE 115-*b* may not receive the first stage SCI. UE 115-*b* may fail to receive the first stage SCI due to a communication mode of UE 115-*b* (e.g., if UE 115-*b* is in half-duplex mode, and UE 115-*b* is transmitting data when the first stage SCI is transmitted, UE 115-*b* may not receive the first stage SCI), beam sweeping techniques for transmitting the first stage SCI (e.g., UE 115-*a* may switch beams, and a beam 205-*a*, such as beam 205-*a*-1, that is received at UE 115-*b* may lack the resource reservation indication), a blocked communication link between UE 115-*a* and UE 115-*b* (e.g., a weak anchor-to-anchor communication link), or a combination thereof. In such cases, anchor UEs 115-*a* and 115-*b* may be unable to coordinate resource selection, and UE 115-*b* may be unaware of the resource reservation by UE 115-*a*. UE 115-*b* may schedule transmissions using the reserved resources, which may result in interference at UE 115-*c*.

To reduce interference and avoid resource collisions on the reserved resources, UE 115-*c* (e.g., a receiving or client UE 115) may perform resource reservation reassurance. By configuring client UE 115-*c* to perform resource reservation reassurance, anchor UE 115-*a* may refrain from increasing latency associated with communications to the one or more other client UEs 115 (e.g., anchor UE 115-*a* may refrain from retransmitting the first stage SCI, adjusting one or more beams 205-*a*, or the like). Client UE 115-*c* may continue to monitor beam 205-*c* and perform resource reservation reassurance for the reserved resources while anchor UE 115-*a* continues communications with the other UEs 115.

Performing the resource reservation reassurance at UE 115-*c* may include receiving the first stage SCI from UE 115-*a* indicating the reserved resources for transmissions to UE 115-*c* and retransmitting (e.g., repeating) the resource reservation indication to one or more other UEs 115, such as UE 115-*b*. UE 115-*c* may transmit control messages including the indication of the reserved resources, other resource reservation reassurance information, or both. In some examples, UE 115-*c* may transmit a first stage SCI and a second stage SCI to convey the resource reservation reassurance information. By transmitting the resource reservation reassurance, UE 115-*c* may reduce interference and improve data reception at UE 115-*c*.

In some examples, the first stage SCI transmitted by UE 115-*c* may include a field for indicating a second stage SCI format (e.g., from a set of configured formats). The field may include a number of bits (e.g., two bits), and a value of the bits (e.g., the logical value '11' or some other value) may indicate a resource reservation reassurance format for the second stage SCI. Additionally or alternatively, the format of the second stage SCI may be indicated by other fields in the first stage SCI (e.g., a combination of time domain resource allocation (TDRA) and frequency domain resource allocation (FDRA) fields), a scrambling sequence for the first stage SCI, reserved bits, RRC signaling, or the like. As described herein, a new format for the second stage SCI may be configured for resource reservation reassurance.

In some examples, if the resource reservation reassurance format is used for the second stage SCI, one or more other fields in the first stage SCI may not be used (e.g., fields for indicating resource allocations for future transmissions, fields for configuring the second stage SCI, fields for configuring feedback, one or more other fields, or a combination thereof). UE 115-*c* may repurpose the unused fields in the first stage SCI to convey resource reservation reassurance information (e.g., in combination with the resource reservation reassurance information conveyed via the second stage SCI). Additionally or alternatively, the unused fields may be repurposed to convey information about the second stage SCI. A UE 115 that receives the first stage SCI may be configured to identify whether the first stage SCI indicates the resource reservation reassurance format for the second stage SCI and decode the first stage SCI based on the repurposed fields if the first stage SCI indicates the resource reservation reassurance format for the second stage SCI.

UE 115-*c* may transmit the resource reservation reassurance information periodically, based on detected interference, based on a negotiation procedure with UE 115-*a*, via a broadcast message or a unicast message, or some combination thereof. In one example, UE 115-*c* may detect interference in the reserved resources. UE 115-*c* may transmit the resource reservation reassurance information based on the detected interference. If UE 115-*c* detects interference from anchor UE 115-*b* on the reserved resources, UE 115-*c* may transmit a unicast message to UE 115-*b* including the resource reservation reassurance information, the indication of the reserved resources, or both. A field in the second stage SCI may be configured for UE 115-*c* to include a source identifier (ID) associated with UE 115-*c* and a destination ID associated with UE 115-*b*. UE 115-*b* may receive the unicast transmission and refrain from transmitting on the reserved resources. Additionally or alternatively, UE 115-*c* may detect interference in the reserved resources and broadcast the reservation reassurance information to one or more nearby UEs 115. In another example, UE 115-*c* may periodically transmit the resource reservation reassurance information. UE 115-*c* may transmit a broadcast or unicast message including the indication of the reserved resources to one or more other UEs 115-*c* according to a configured resource reservation reassurance periodicity. In some examples, UE 115-*a* and UE 115-*c* may negotiate a transmission occasion for UE 115-*c* to transmit the reservation reassurance.

As described herein, a receiving UE 115, such as UE 115-c, may transmit an indication of reserved resources, resource reservation reassurance information, or both, to reassure a set of resources that are reserved for transmissions to the UE 115. The UE 115 may be configured to transmit the reservation reassurance via a broadcast or unicast SCI message to inform nearby UEs 115 of the reserved resources, reduce interference on the reserved resources, and improve quality of communications in the wireless communications system 200.

Figure 3A:
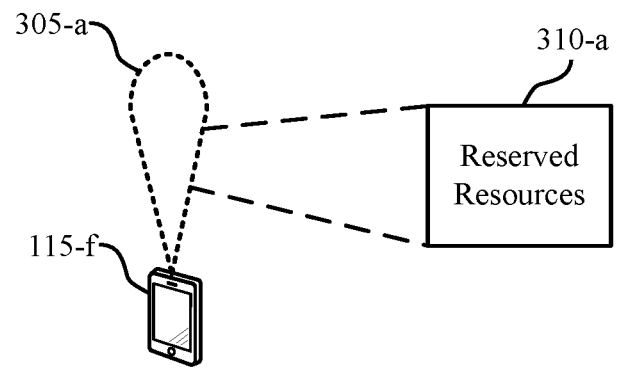
FIGS. 3A and 3B illustrate examples of beam configurations in accordance with aspects of the present disclosure.
Figure 3B:
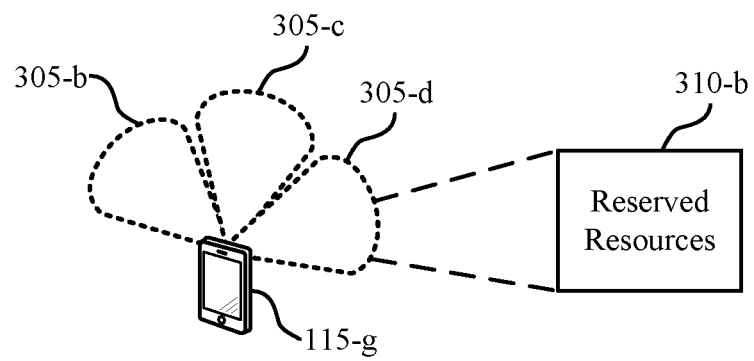

FIGS. 3A and 3B illustrate examples of beam configurations 300-a and 300-b in accordance with aspects of the present disclosure. Beam configurations 300-a and 300-b may be examples of beam configurations for a client UE 115 to transmit resource reservation reassurance information, as described with reference to FIG. 2. Beam configurations 300-a and 300-b may provide for improved techniques for reassuring reserved resources to avoid resource collisions in a wireless communications system (e.g., in a mmW system).

FIG. 3A illustrates beam configuration 300-a for a receiving UE 115-f. In the example of beam configuration 300-a, UE 115-f may transmit an indication of reserved resources, resource reservation reassurance information, or both, via beam 305-a. UE 115-f may receive an indication of reserved resources for future transmissions to UE 115-f via beam 305-a, and UE 115-f may transmit the resource reservation reassurance information via the same beam 305-a. In some examples, reserved resources 310-a may be reserved for reception by UE 115-f in beam 305-a.

One or more anchor UEs 115 that may schedule transmissions in the reserved resources 310-a may monitor beam 305-a and may receive the resource reservation reassurance from UE 115-f. The anchor UEs 115 may refrain from scheduling transmissions on reserved resources 310-a based on the reservation reassurance, which may reduce interference and improve communications at UE 115-f.

In some examples, UE 115-f may transmit the resource reservation reassurance information via a unicast message on beam 305-a. UE 115-f may detect interference on beam 305-a from a second UE 115 (e.g., an anchor UE 115), and UE 115-f may transmit the unicast message to the second UE 115 to indicate the reserved resources and reduce the interference.

By transmitting the resource reservation reassurance information via a single beam 305-a, UE 115-f may consume less power than if UE 115-f transmitted the resource reservation reassurance information via multiple beams 305, and UE 115-f may improve the reliability of communications at UE 115-f. In some examples, UE 115-f may transmit the resource reservation reassurance via beam 305-a for a time period, and if UE 115-f detects interference after the time period, UE 115-f may transmit the resource reservation reassurance via multiple beams 305, or using beam sweeping techniques as described in FIG. 3B.

FIG. 3B illustrates a beam configuration 300-b for a receiving UE 115-g. Receiving UE 115-g may be an example of receiving UE 115-f as described with reference to FIG. 3A. In the example of beam configuration 300-b, UE 115-g may transmit an indication of reserved resources 310-b, resource reassurance information, or both, using beam sweeping techniques. For example, beams 305-b, 305-c, and 305-d may be beams in different directions. Additionally or alternatively, UE 115-g may transmit the resource reservation reassurance information using a beam 305-b, followed by beam 305-c, then using beam 305-d, so as to transmit the resource reservation reassurance information in multiple directions. In some examples, one or more of beams 305-b, 305-c, and 305-d may be broader than beam 305-a as described with reference to FIG. 3A (e.g., transmissions via each beam 305 may cover a larger area than transmissions via beam 305-a).

In some examples of beam configuration 300-b, UE 115-g may first transmit the resource reservation reassurance information via a single beam 305, as described with reference to UE 115-f and beam 305-a in FIG. 3A. If UE 115-g detects resource collisions and interference in reserved resources 310-b after transmitting the resource reservation reassurance information via the single beam 305, UE 115-g may transmit the resource reservation reassurance information using a broader beam 305 (e.g., beam 305-d), via multiple beams 305-b, 305-c, and 305-d, using beam sweeping techniques, or a combination thereof. In some examples, UE 115-g may detect interference in reserved resources 310-b for a time period (e.g., a configured time period) before transitioning to transmitting the reservation reassurance information via multiple beams 305.

By transmitting the reassurance information via multiple broad beams 305-b, 305-c, and 305-d, the resource reservation reassurance information may reach a relatively large number of UEs 115 that may be scheduling transmissions in, or currently interfering with, reserved resources 310-b. If UE 115-g transmits resource reservation reassurance information via multiple beams 305, the resource reservation reassurance information may include beam-related information. For example, the resource reservation reassurance information may include a beam index for reservation reassurance, collision indication, resource recommendation, or a combination thereof to indicate which beam is associated with the respective resource reservation reassurance information. In some examples, transmissions from an anchor UE 115 may cause interference in reserved resources 310-b on beam 305-d, but the anchor UE 115 may subsequently adjust beams such that the anchor UE 115 may not monitor beam 305-d including reserved resources 310-b. In such cases, UE 115-g may transmit the indication of the reserved resources and the resource reservation reassurance information to the anchor UE 115 by transmitting the reassurance information via multiple beams 305, sweeping the beams 305 in multiple directions, or both, which may improve the probability that the anchor UE 115 receives the reassurance information.

Figure 4:
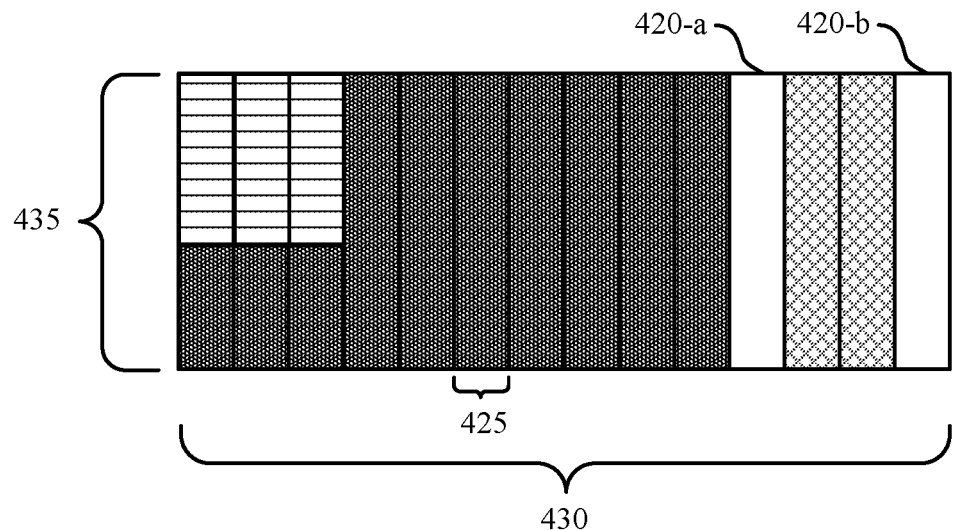
FIG. 4 illustrates an example of a resource configuration in accordance with aspects of the present disclosure.
Figure 4:
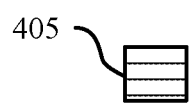
Figure 4:
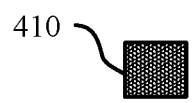
Figure 4:
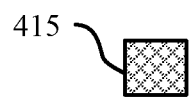
Figure 4:

FIG. 4 illustrates an example of a resource configuration 400 in accordance with aspects of the present disclosure. The resource configuration 400 may illustrate a configuration of resources in a subchannel 435 and a slot 430. The resource configuration 400 may include first stage SCI resources 405, second stage SCI resources 410, physical sidelink feedback channel (PSFCH) resources 415, and one or more empty resources (e.g., gaps 420-a and 420-b). The resource configuration 400 may be an example of a configuration of resources for a first UE (e.g., UE 115-c as described with reference to FIG. 2) to use for conveying resource reservation reassurance information, as described with reference to FIG. 2. In the example of the resource configuration 400, the second stage SCI resources 410 may be configured according to a defined format for resource reservation reassurance.

As described with reference to FIG. 2, UEs 115 may communicate using one or more beams, communication links, or both, which may include one or more subchannels 435 for communicating data. The subchannels 435 may be communicated across a number of slots 430 in the time domain, and each slot 430 may include some number of symbols 425 (e.g., 14 OFDM symbols within a slot 430, or some other number of symbols). Each subchannel 435 may include a number of physical resource blocks (PRBs) in the frequency domain (e.g., one subchannel 435 may include 10, 50, 100, or some other number of PRBs).

One or more of the symbols 425 and the PRBs of the subchannel 435 may be configured for each of the first stage SCI resources 405, the second stage SCI resources 410, or the PSFCH resources 415. Additionally or alternatively, the subchannel 435 may include one or more gaps 420, such as gaps 420-*a* and 420-*b*, configured before and after the PSFCH resources 415 within the subchannel 435. A first stage SCI message may be transmitted in the first stage SCI resources 405 occupying a number of symbols 425 of a slot 430 (e.g., two symbols 425, three symbols 425, or some other number of symbols 425) and some number of PRBs of a subchannel 435 (e.g., 10, 12, 15, 25, or some other number of PRBs in a subchannel 435). In some cases, first stage SCI (e.g., a PSCCH) may occupy up to one subchannel 435 (e.g., a subchannel 435 with the lowest subchannel index). A second stage SCI message may be transmitted in the second stage SCI resources 410, or in physical sidelink shared channel (PSSCH) resources (e.g., not pictured in the resource configuration 400), which may occupy a number of symbols 425 in the slot 430 and a number of subchannels 435 (e.g., one subchannel 435, two subchannels 435, or some other number of contiguous subchannels 435).

In some cases, the first stage SCI may include one or more fields to indicate a location of resources reserved for future transmissions. UEs may decode the first stage SCI for channel sensing and to avoid resource collisions. For example, the first stage SCI may include one or more fields to convey a FDRA, a TDRA, a resource reservation period (e.g., a period for repeating the SCI transmission and the corresponding reserved resources), a modulation and coding scheme (MCS) for a second stage SCI (e.g., MCS tables), a beta offset value for the second stage SCI (e.g., SCI-2 rate matching), a format for the second stage SCI, a demodulation reference signal (DMRS) port (e.g., one bit indicating one or two data layers), a DMRS pattern, a PSFCH overhead indicator, a priority (e.g., three bits), one or more additional reserved bits, or a combination thereof. In some examples, the FDRA may be a number of bits in the first stage SCI that may indicate a number of RBs and a number of subchannels 435 reserved for future transmissions, and the TDRA may be a number of bits in the first stage SCI (e.g., 5 bits, 9 bits, or some other number of bits) that may indicate a number of symbols 425 reserved for future transmissions (e.g., the FDRA and TDRA may indicate a number of PSSCH resources for future transmissions).

In the example of the resource configuration 400, the first stage SCI and the second stage SCI may be used by a receiving UE for transmitting reservation reassurance. In such cases, one or more of the fields in the first stage SCI may be repurposed. For example, when a first receiving UE, such as UE 115-*c* as described with reference to FIG. 2, receives an indication of reserved resources and transmits the first stage SCI and second stage SCI to indicate resource reservation reassurance information, the TDRA field and the FDRA field in the first stage SCI may not be used for indicating resource allocations for future transmissions (e.g., the first stage SCI may not indicate future transmissions by the first UE). The beta offset field and the MCS field may not be used because a format for the second stage SCI configured for resource reservation reassurance may be associated with configured beta offset and MCS values (e.g., the resource reservation reassurance format and associated values may be defined in a standard). The reservation interval field may not be used because the first UE may not transmit future transmissions after transmitting the reservation reassurance. The PSFCH overhead field may or may not be used in the first stage SCI. In some examples, the PSFCH resources 415 may be configured in the subchannel 435. Additionally or alternatively, the PSFCH resources 415 may not be configured for transmitting feedback (e.g., there may not be feedback for the resource reservation reassurance information), and the PSFCH overhead field may not be used in the first stage SCI. In some examples, one or more other fields in the first stage SCI may not be used.

The unused fields in the first stage SCI may be repurposed for resource reservation reassurance. In one example, the FDRA and TDRA fields may be repurposed to indicate time and frequency configurations for the reserved resources on which the first UE expects to receive transmissions. The reservation interval field may be repurposed to indicate a periodicity (e.g., a configured periodicity) for transmitting the resource reservation reassurance or a periodicity for reception on the reserved resources. The one or more other repurposed fields may be merged with the FDRA and TDRA fields to convey the indication of the reserved resources, additional resource reservation reassurance information, or both. Additionally or alternatively, the repurposed fields may convey indications of resource reservation reassurance information that will be included in the second stage SCI. A UE that receives the first stage SCI may be configured to identify the repurposed fields for reservation reassurance based on the indication of the second stage SCI format. For example, if the UE identifies that the first stage SCI and the second stage SCI are configured for reservation reassurance (e.g., via the second stage SCI field in the first stage SCI, a CRC scrambling sequence in the first stage SCI, a number of reserved bits, or the like), the UE may decode the repurposed fields in the first stage SCI accordingly.

The second stage SCI may be transmitted via the second stage SCI resources 410 or via a PSSCH. The second stage SCI may include one or more fields to provide information for sidelink transmissions in a PSSCH. For example, the second stage SCI may include a HARQ ID field, a new data indicator (NDI) bit, a redundancy version (RV) ID field, a source ID field (e.g., eight bits), a destination ID field (e.g., 16 bits), a HARQ enable or disable bit, a cast type, a CSI request field, a zone ID (e.g., 12 bits), a communication range field (e.g., four bits), or a combination thereof.

As described herein, a resource reservation format for the second stage SCI may be introduced. The resource reservation reassurance format for the second stage SCI may be configured to include one or more fields for conveying reservation reassurance information. The first stage SCI may include a field for indicating the second stage SCI format, and a value of the bits in the field may be configured to indicate the resource reservation reassurance format for the second stage SCI (e.g., the field may include two bits, and the logical value '11,' or some other value, may indicate the new format for second stage SCI). Additionally or alternatively, the format of the second stage SCI may be indicated via a CRC scrambling sequence of the first stage SCI, the FDRA and TDRA fields of the first stage SCI, a number of reserved bits, RRC signaling, or a combination thereof.

The one or more fields for conveying resource reservation reassurance information in the second stage SCI may include fields for conveying a source ID, a destination ID, a cast type associated with the transmission of the SCI, reservation reassurance (e.g., a collision indication), resource recommendations, a sensing report, some other reservation reassurance information, or a combination thereof. Additionally or alternatively, the second stage SCI may include a FDRA field, a TDRA field, a resource reservation time interval field, or the like, for indicating resources used by the first UE for reception. The number of time and frequency resources that are reserved for transmitting the second stage SCI (e.g., a size of the payload of the second stage SCI message) may be based on the amount of information conveyed via the second stage SCI (e.g., the number of fields configured for reservation reassurance), or vice versa.

In some examples, the resource reservation reassurance format for the second stage SCI may include a field for conveying a source ID of the first UE, a destination ID, and a cast type associated with the second stage SCI message. For example, the first UE may transmit a unicast message to a second UE that is interfering with the reserved resources, and the first UE may include the ID of the second UE in the destination ID field and an indication of a unicast message in the cast type field. In another example, the first UE may broadcast the message to multiple other UEs, and the first UE may refrain from transmitting an ID in the destination ID field and may indicate the message is a broadcast message in the cast type field. In some examples, a broadcast message may be a default configuration for reservation reassurance, and the first UE may refrain from transmitting the cast type if the second stage SCI is broadcast to multiple UEs. If HARQ feedback is configured, the field may convey HARQ process information.

In some examples, the resource reservation reassurance format for the second stage SCI may include a reservation reassurance field, which may be referred to as a collision indication field. The first UE may transmit an indication of the reserved resources, an indication of resources on which the first UE detects interference, or both, via the reservation reassurance field. The indication of the reserved resources may include an indication of a time and frequency allocation for the reserved resources, a periodicity, a transmitter ID, or a combination thereof. For example, the indication of the reserved resources may include a first TDRA field, a first FDRA field, a periodicity, and a transmitter ID to indicate resources reserved for future transmissions by the transmitter (e.g., the reservation reassurance field may include TDRA-1/FDRA-1+period+TX_ID). In some examples, the indication of the reserved resources may not include the transmitter ID. By transmitting the indication of the reserved resources via the second stage SCI, the first UE may indicate the periodicity of the reserved resources (e.g., if the indication of the reserved resources is transmitted via the first stage SCI, the FDRA and TDRA fields in the first stage SCI may assume contiguous resource allocations). The first UE may monitor for transmissions from a transmitting UE (e.g., the UE may monitor a beam, a communication link, or the like), and the first UE may detect or measure interference on some or all of the reserved resources. The reservation reassurance field in the second stage SCI may include an indication of the resources on which the first UE observed collisions. The collision indication may include a second TDRA field, a second FDRA field, a periodicity, a transmitter ID, or a combination thereof, similar to the resource reservation indication (e.g., the collision indication may include TDRA-2/FDRA-2+period+TX_ID).

In some examples, the resource reservation reassurance format for the second stage SCI may include a resource recommendation field. The first UE may know the resource utilization on the beam or the communication link because the first UE may monitor for transmissions from a transmitting UE on a same beam or a same communication link over time. The first UE may recommend resources for other neighboring UEs (e.g., transmitting UEs) to use for communications. The resource recommendation field may include an indication of preferred resources for communications by other UEs, an indication of non-preferred resources for communications by other UEs, or both. The first UE may transmit an indication of a first time and frequency allocation (e.g., FDRA-R1 and TDRA-R1) for resources the first UE recommends other transmitting UEs use for communications. The first UE may transmit an indication of a second time and frequency allocation (e.g., FDRA-R2 and TDRA-R2) for resources the first UE does not recommend other transmitting UEs use for communications (e.g., the reserved resources).

In some examples, the resource reservation reassurance format for the second stage SCI may include a sensing report field. The first UE may measure reference signal received power (RSRP) for each resource element, and the first UE may transmit the RSRP measurements via the sensing report field. For example, the sensing report field may include a quantized RSRP measurement, an FDRA, and a timestamp, for each resource (e.g., Quantized RSRP measured+FDRA+ Time Stamp). Other UEs that receive the second stage SCI may reuse the sensing report information. If the second stage SCI message is broadcast, multiple UEs (e.g., client UEs, anchor UEs, and other devices) may reuse the sensing report information to reduce power consumption. The UEs may determine whether the sensing report information is valid for use based on the time stamp indication.

It is to be understood that the described fields for the second stage SCI resource reservation reassurance format are provided as examples, and the described resource reservation reassurance format for the second stage SCI may include any number of fields for conveying resource reservation reassurance or other information.

As described herein, the resource reservation reassurance format for the second stage SCI may be associated with a configured (e.g., fixed) resource allocation or an adjustable resource allocation for the second stage SCI message. In some cases, the first stage SCI may dynamically indicate a resource allocation for the second stage SCI and a PSSCH (e.g., via the TDRA, FDRA, and beta offset fields). However, if the resource allocation is configured, the configuration may be indicated via RRC signaling, or other upper layer signaling. The UEs may receive RRC signaling indicating that if the resource reservation reassurance format is used for the second stage SCI, the second stage SCI will occupy a configured number of resources and will convey a configured number of reassurance information fields. For example, the resource reservation reassurance format for the second stage SCI may be configured to occupy a number of subchannels 435 and symbols 425 (e.g., a configured number of time and frequency resources). In such cases, the one or more fields in the first stage SCI configured for dynamic resource allocation for the second stage SCI and the PSSCH (e.g., the TDRA, FDRA, and beta offset fields) may not be used for resource allocation for the second stage SCI (e.g., or for resource allocation for the PSSCH), and may be repurposed for resource reservation reassurance, or some other application. In one example, the resource reservation reassurance format may indicate that the second stage SCI resources 410 occupy one subchannel 435 and all symbols 425 in the subchannel 435 (e.g., a standalone mode for the second stage SCI). If the second stage SCI resources occupy X subchannels 435 and all symbols 425 of the subchannels 435 (e.g., all symbols 425 previously configured as PSSCH symbols 425), HARQ feedback, HARQ-based retransmissions, or the like, may not be configured for the second stage SCI. Additionally or alternatively, if the PSFCH resources 415 are configured in a slot 430, the second stage SCI resources 410 may occupy all resources in the subchannel 435 that are nonoverlapping with the PSFCH resources 415 and gaps 420-*a* and 420-*b* in the slot 430.

If the resource allocation is configurable, the one or more unused fields in the first stage SCI may be repurposed to indicate the resource allocation for the second stage SCI (e.g., the repurposed fields in the first stage SCI may validate the resource reservation reassurance format for the second stage SCI). The repurposed fields may indicate a number of time and frequency resources that are allocated for the second stage SCI, a number of fields that are included in the second stage SCI (e.g., an amount of reservation reassurance information that is conveyed via the second stage SCI), or both. The first stage SCI may indicate which fields are configured in the second stage SCI, and a UE that receives the first stage SCI may determine a number of resources that are allocated for the second stage SCI based on the indicated number of fields. Additionally or alternatively, the first stage SCI may indicate the resource allocation for the second stage SCI.

In one example, a first number of resources may be allocated for a second stage SCI that includes the resource reservation reassurance field (e.g., the second stage SCI may occupy one subchannel 435 and all symbols 425 in the subchannel 435, or some other time and frequency resource allocation). A second number of resources may be allocated for a second stage SCI that includes the resource reservation reassurance field and the recommended resources field (e.g., the second stage SCI may occupy two subchannels 435 and all symbols 425 in the subchannels 435, or some other time and frequency resource allocation). A third resource allocation may be provided for a second stage SCI that includes the resource reservation reassurance field, the recommended resources field, and the sensing report field (e.g., the second stage SCI may occupy three subchannels 535 and all symbols 425 in the subchannels 535). It is to be understood that the described resource allocations for the second stage SCI are provided as examples, and the second stage SCI may include any number of fields and may occupy any number of resources.

As described herein, a number of subchannels 435 and symbols 425 may be allocated for a first UE to transmit first stage SCI and second stage SCI for resource reservation reassurance. The number of time and frequency resources allocated as first stage SCI resources 405 and second stage SCI resources 410 may be a configured or dynamic number of resources that may be indicated via the first stage SCI, the second stage SCI, or upper layer signaling. By transmitting the first stage SCI and the second stage SCI for reservation reassurance, the first UE may reduce interference in the reserved resources and improve communications at the first UE.

Figure 5A:
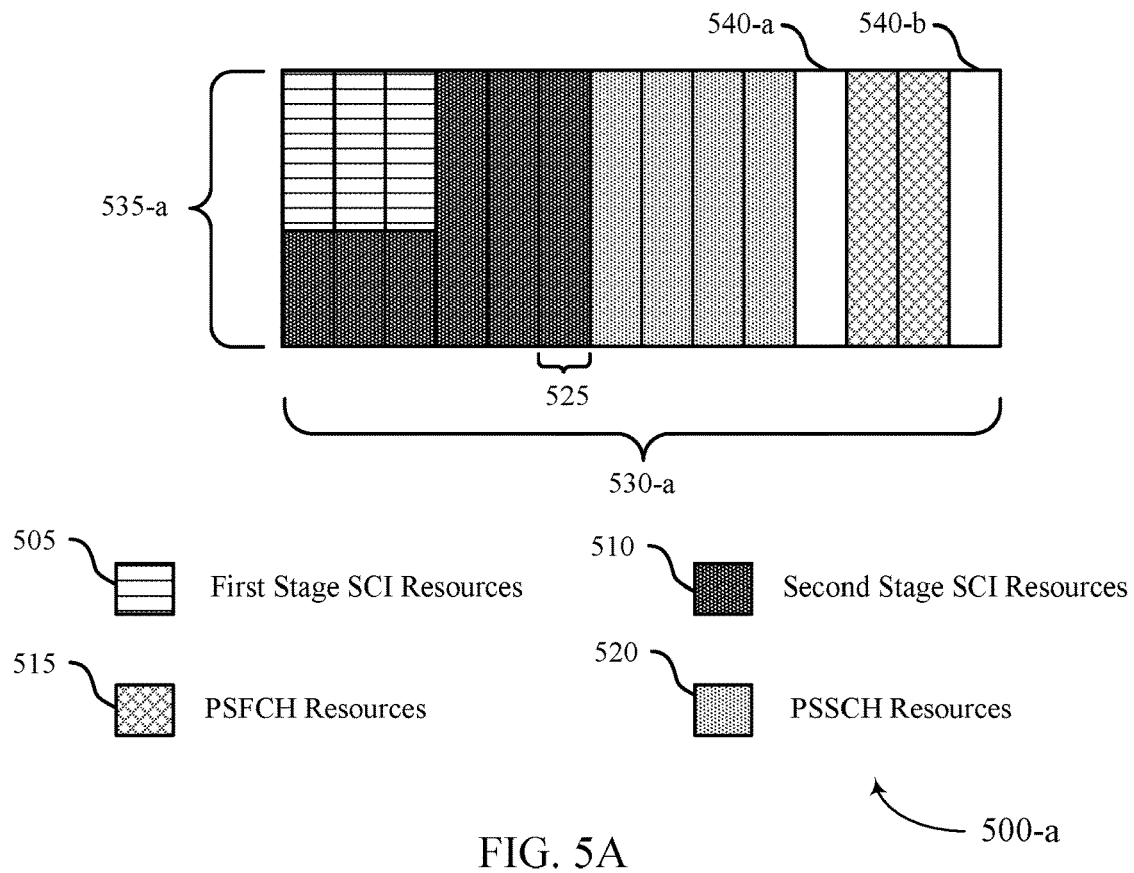
FIGS. 5A and 5B illustrate examples of resource configurations in accordance with aspects of the present disclosure.
Figure 5B:
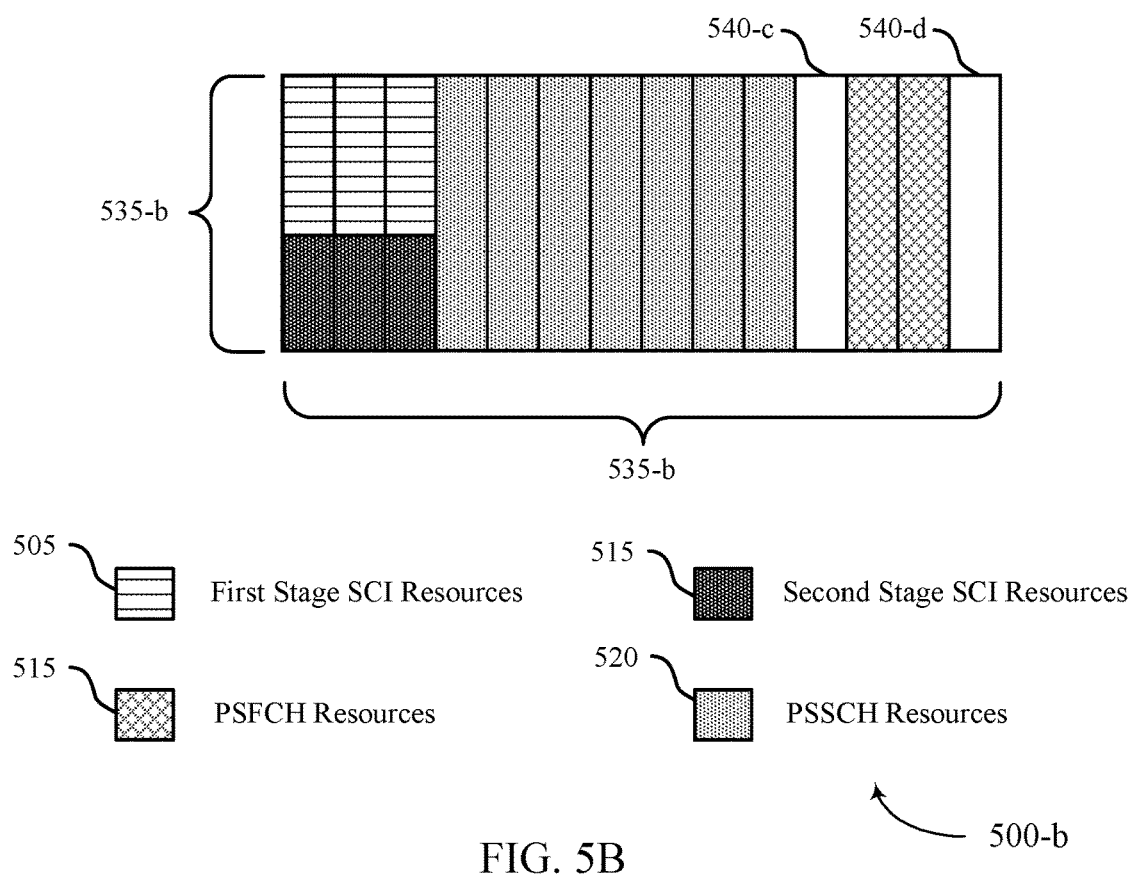

FIGS. 5A and 5B illustrate examples of resource configurations 500-*a* and 500-*b* in accordance with aspects of the present disclosure. The resource configurations 500-*a* and 500-*b* may illustrate configurations of resources in subchannels 535-*a* and 535-*b* and slots 530-*a* and 530-*b*. Resource configurations 500-*a* and 500-*b* may include allocations for first stage SCI resources 505, second stage SCI resources 510, PSFCH resources 515, PSSCH resources 520, and one or more empty resources (e.g., gaps 540-*a* and 540-*b*).

Resource configurations 500-*a* and 500-*b* may be examples of configurations of resources for a first UE (e.g., UE 115-*c* as described with reference to FIG. 2) to use for conveying resource reservation reassurance information, as described with reference to FIGS. 2 and 4. In the example of resource configurations 500-*a* and 500-*b*, the first stage SCI resources 405 and the second stage SCI resources 510 may be configured for resource reservation reassurance within a subchannel 535. Additionally or alternatively, the PSSCH resources 520 may be configured for sidelink transmissions, and the PSFCH resources 515 may be configured for feedback for the sidelink transmissions in the PSSCH resources 520, feedback for the second stage SCI reservation reassurance message, or the PSFCH resources 515 may not be configured in the subchannels 535.

As described with reference to the subchannel 435 in FIG. 4, the subchannels 535-*a* and 535-*b* may be communicated across a number of slots 530 (e.g., and symbols 525) in the time domain, and a number of PRBs in the frequency domain.

It is understood that the subchannels 535 and slots 530 described by the resource configurations 500-*a* and 500-*b* may include resources that are not illustrated and may be configured according to one or more resource configurations that are not illustrated. For instance, any number of symbols 525 may be allocated for any type of communications. Alternative examples of the following may be implemented, where some control messages and sidelink transmissions utilize resource configurations that are different from the resource configurations shown.

FIG. 5A illustrates a first resource configuration 500-*a*. Resource configuration 500-*a* illustrates an example of a resource allocation for time and frequency resources within a subchannel 535-*a*. Resource configuration 500-*a* may include some number of resources allocated as first stage SCI resources 505 (e.g., physical sidelink control channel (PSCCH) resources), a number of resources allocated as second stage SCI resources 510, a number of resources allocated as PSSCH resources 520, a number of resources allocated as PSFCH resources 515, and a number of resources allocated as empty resources (e.g., gaps 540-*a* and 540-*b*).

A first UE may use the first stage SCI resources 505 and the second stage SCI resources 510 for conveying an indication of reserved resources, resource reservation reassurance information, or both, and remaining resources in subchannel 535-*a* (e.g., the PSSCH resources 520) may be used for sidelink communications.

A number of symbols 525 (e.g., three symbols 525) and some number of PRBs (e.g., 10 PRBs, 15 PRBs, or some other number of PRBs) may be allocated as the first stage SCI resources 505, which may be an example of the first stage SCI resources 405 as described with reference to FIG. 4. A number of symbols 525, subchannels 535, and PRBs (e.g., seven symbols 525 and all of the PRBs in subchannel 535-*a*, or some other number of symbols 525 and subchannels 535) may be allocated as the second stage SCI resources 510, which may be an example of the second stage SCI resources 410 as described with reference to FIG. 4.

In the example of resource configuration 500-*a*, the number of time and frequency resources that are allocated as the second stage SCI resources 510 may be indicated via the first stage SCI. For example, a FDRA field, a TDRA field, a beta offset field, one or more other fields, or a combination thereof may be repurposed in the first stage SCI for indicating information about the second stage SCI. The repurposed fields may indicate a number of fields that are configured in the second stage SCI, which may indicate a size of the second stage SCI payload (e.g., a time and frequency resource configuration for the second stage SCI resources 510).

The second stage SCI may include the reservation reassurance field, or the second stage SCI may include the reservation reassurance field and the resource recommendation field, or the second stage SCI may include any combination of fields as described with reference to FIG. 4. The first stage SCI may indicate the number of fields that are included in the second stage SCI to a second UE that receives the control messages (e.g., an interfering or neighboring UE), and the second UE may decode the second stage SCI accordingly. The first stage SCI may indicate a number of symbols 525 or subchannels 535 that the second stage SCI may occupy, or the number of symbols 525 and subchannels 535 may be determined by the second UE based on the indicated number of fields that are included in the second stage SCI, as described with reference to FIG. 4.

The second UE may decode the second stage SCI and obtain the resource reservation reassurance information in the second stage SCI resources 510, and the second UE (e.g., an anchor UE or a PLC) may use the remaining resources (e.g., the PSSCH resources 520) for sidelink communications. In some examples, the second UE may determine the number of resources allocated for the second stage SCI, and the second UE may determine that the remaining resources in subchannel 535-*a* are available resources.

Additionally or alternatively, an anchor UE that may schedule the reserved resources for transmissions between the anchor UE and the first UE may use the remaining PSSCH resources 520 for sidelink communications (e.g., semi-persistent scheduling (SPS) transmissions). The anchor UE may negotiate a transmission occasion with the first UE for transmitting the reservation reassurance. For example, the anchor UE and the first UE may negotiate the resource allocation for the second stage SCI resources 510 illustrated in FIG. 5A. The anchor UE may reconfigure the remaining resources in subchannel 535-*a* as the PSSCH resources 520. The first stage SCI may indicate the number of PSSCH resources 520 in subchannel 535-*a* (e.g., the first stage SCI may indicate rate-matching around the second stage SCI resources 510). In one example, the FDRA and TDRA fields in the first stage SCI may indicate the PSSCH resources 520 (e.g., a resource reservation for retransmissions or other sidelink communications).

In some examples, the first UE may use the PSSCH resources 520 for sidelink communications. If the first UE has unicast data traffic, or some other data to communicate, the first UE may multiplex the data traffic with the first stage SCI and the second stage SCI in subchannel 535-*a*. The first UE may include a destination ID and a source ID for the communications in the second stage SCI.

By transmitting reservation reassurance in the second stage SCI resources 510, the first UE may efficiently use communication resources to improve sidelink communications at the first UE. An anchor UE, the second UE, or one or more other UEs may utilize remaining resources in subchannel 535-*a* for sidelink communications, for scheduling, for feedback, or the like.

FIG. 5B illustrates a second resource configuration 500-*b*. Resource configuration 500-*b* illustrates an example of a resource allocation for time and frequency resources within a subchannel 535-*b*. Resource configuration 500-*b* may include some number of resources allocated as first stage SCI resources 505 (e.g., PSCCH resources), a number of resources allocated as second stage SCI resources 510, a number of resources allocated as PSSCH resources 520, a number of resources allocated as PSFCH resources 515, and a number of resources allocated as empty resources (e.g., gaps 540-*c* and 540-*d*). A first UE may use the first stage SCI resources 505, the second stage SCI resources 510, the PSSCH resources 520, or a combination thereof for conveying an indication of reserved resources, resource reservation reassurance information, or both.

In the example of resource configuration 500-*b*, the second stage SCI resources 510 may occupy some number of RBs and some number of symbols 525 within subchannel 535-*b* (e.g., 10 RBs and three symbols 525, or some other number of RBs and symbols 525). The number of resources configured as the second stage SCI resources 510 in resource configuration 500-*b* may be less than the number of resources configured as the second stage SCI resources 510 in resource configuration 500-*a* (e.g., the second stage SCI payload may be smaller). The second stage SCI message may convey less information in subchannel 535-*b* than the second stage SCI message in subchannel 535-*a*.

In some examples, the second stage SCI message may be transmitted periodically (e.g., in slot 530-*b* and every X number of slots 530 of subchannel 535-*b*, where X is a configured periodicity for the second stage SCI) at configured transmission occasions. The periodicity for the second stage SCI may be indicated via the first stage SCI, the second stage SCI, or both. For example, a resource interval field, or some other field, in the first stage SCI or the second stage SCI may indicate the configured periodicity. Additionally or alternatively, the first UE may detect interference, and the first UE may transmit the reservation reassurance based on the detected interference.

In one example, an anchor UE (e.g., a transmitting UE or a PLC) that configures the reserved resources for communications between the anchor UE and the first UE may negotiate a resource reservation reassurance transmission occasion with the first UE (e.g., a client UE or S/A), as described with reference to FIG. 5A. The first UE and the anchor UE may perform a negotiation procedure to determine a transmission occasion for the reservation reassurance (e.g., a number of symbols 525 for transmitting the reservation reassurance, a periodicity for transmitting the reservation reassurance, or both). The negotiation procedure may provide for the first UE to transmit the reservation reassurance in the negotiated resources, and for the anchor UE to perform sidelink communications or scheduling (e.g., SPS) in the remaining resources. For example, the anchor UE may configure the remaining resources as the PSSCH resources 520, which may improve resource utilization and reliability of communications.

In some examples, the second stage SCI may be transmitted according to a format that is different from the resource reservation reassurance format (e.g., a logical MAC report), or none of the resources in subchannel 535-*b* may be configured as the second stage SCI resources 510. The first UE may transmit the indication of the reserved resources, the resource reservation reassurance information, or both, via the PSSCH resources 520. If the second stage SCI is transmitted according to a different format, the first UE may transmit an indication of the PSSCH resources 520 via the second stage SCI (e.g., the second stage SCI may schedule the PSSCH).

Figure 6:
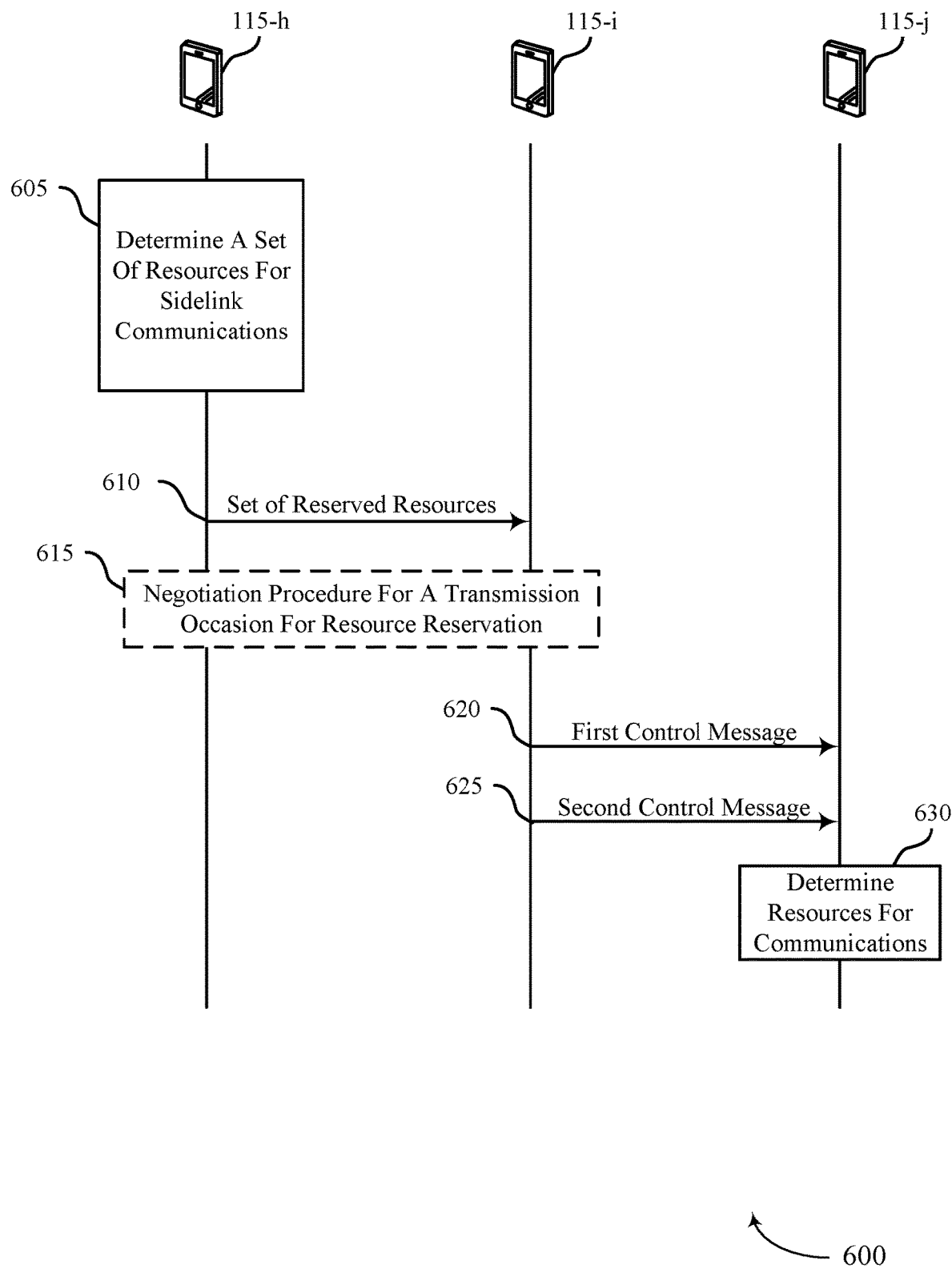
FIG. 6 illustrates an example of a process flow in accordance with aspects of the present disclosure.

FIG. 6 illustrates an example of a process flow 600 in accordance with aspects of the present disclosure. In some examples, the process flow 600 may implement various aspects of the present disclosure described with reference to FIGS. 1-5. The process flow 600 may include UE 115-*h*, UE 115-*i*, and UE 115-*j*, which may be examples of UEs 115 as described with reference to FIGS. 1-3. UE 115-*i* may be an example of a receiving or client UE 115, and UEs 115-*h* and 115-*j* may be examples of a transmitting or anchor UEs 115, as described with reference to FIG. 2. In some examples, UE 115-*i* may transmit control messages (e.g., first and second stage SCI) to UE 115-*j* to reassure resources that are reserved for communications between UE 115-*h* and UE 115-*i*. Alternative examples of the following may be implemented, where some steps are performed in a different order than described or are not performed at all. In some cases, a step may include additional features not mentioned below, or further steps may be added.

In the following description of the process flow 600, the operations between UEs 115-*h*, 115-*i*, and 115-*j* may be performed in different orders or at different times. Some operations may also be left out of the process flow 600, or other operations may be added. It is to be understood that while the operations of the process flow 600 are shown between UEs 115, any wireless device (e.g., PLCs and S/As in an IIoT system, or any other devices) may perform the operations shown in any order to efficiently perform resource reservation reassurance.

At 605, UE 115-*h* (e.g., an anchor UE 115-*h*) may determine a set of resources for sidelink communications with UE 115-*i*.

At 610, UE 115-*h* may transmit an indication of the set of resources to UE 115-*i* and one or more other UEs 115. For example, UE 115-*h* may broadcast a control message (e.g., first stage SCI) that includes the indication of the set of resources. In some examples, UE 115-*j* may not receive the control message due to interference, a blocked communication link, beamforming techniques, or the like. UE 115-*i* may receive the indication of the set of reserved resources and may determine to perform resource reservation reassurance for the set of reserved resources.

At 615, in some examples, UE 115-*h* and UE 115-*i* may negotiate a transmission occasion for reservation reassurance. The transmission occasion may be configured for UE 115-*i* to transmit a second indication of the reserved resources.

At 620, UE 115-*i* may transmit a first control message for reservation reassurance of the set of reserved resources to UE 115-*j*. The first control message may include an indication of a resource configuration for a second control message for reservation reassurance. In some examples, one or more fields of the first control message may be repurposed for resource reservation reassurance. For example, the first control message may include resource reservation reassurance information, an indication of an amount of information in the second control message, or both.

At 625, UE 115-*i* may transmit the second control message for reservation reassurance to UE 115-*j*. The second control message may include the indication of the set of reserved resources for sidelink communications between UE 115-*h* and UE 115-*i*. In some examples, the second control message may include resource reservation reassurance information. For example, the second control message may include a source ID of UE 115-*i*, a destination ID (e.g., an ID of UE 115-*j* or another UE 115), a reservation reassurance indication, a recommended resource indication, a sensing report, or a combination thereof.

In some examples, at 620 and 625, UE 115-*i* may broadcast the first control message, the second control message, or both to UE 115-*j* and one or more other UEs 115. Additionally or alternatively, UE 115-*i* may transmit the first control message, the second control message, or both in a unicast message to UE 115-*j*. UE 115-*i* may transmit the control messages periodically (e.g., according to a configured periodicity), based on detecting interference on the reserved resources, based on the negotiation procedure for the transmission occasion performed at 615, or a combination thereof.

At 630, UE 115-*j* may determine resources for communications by UE 115-*j* based receiving on the first control message and the second control message. UE 115-*j* may select resources for communications that are nonoverlapping with the reserved resources indicated in the control messages to reduce interference in the reserved resources.

Figure 7:
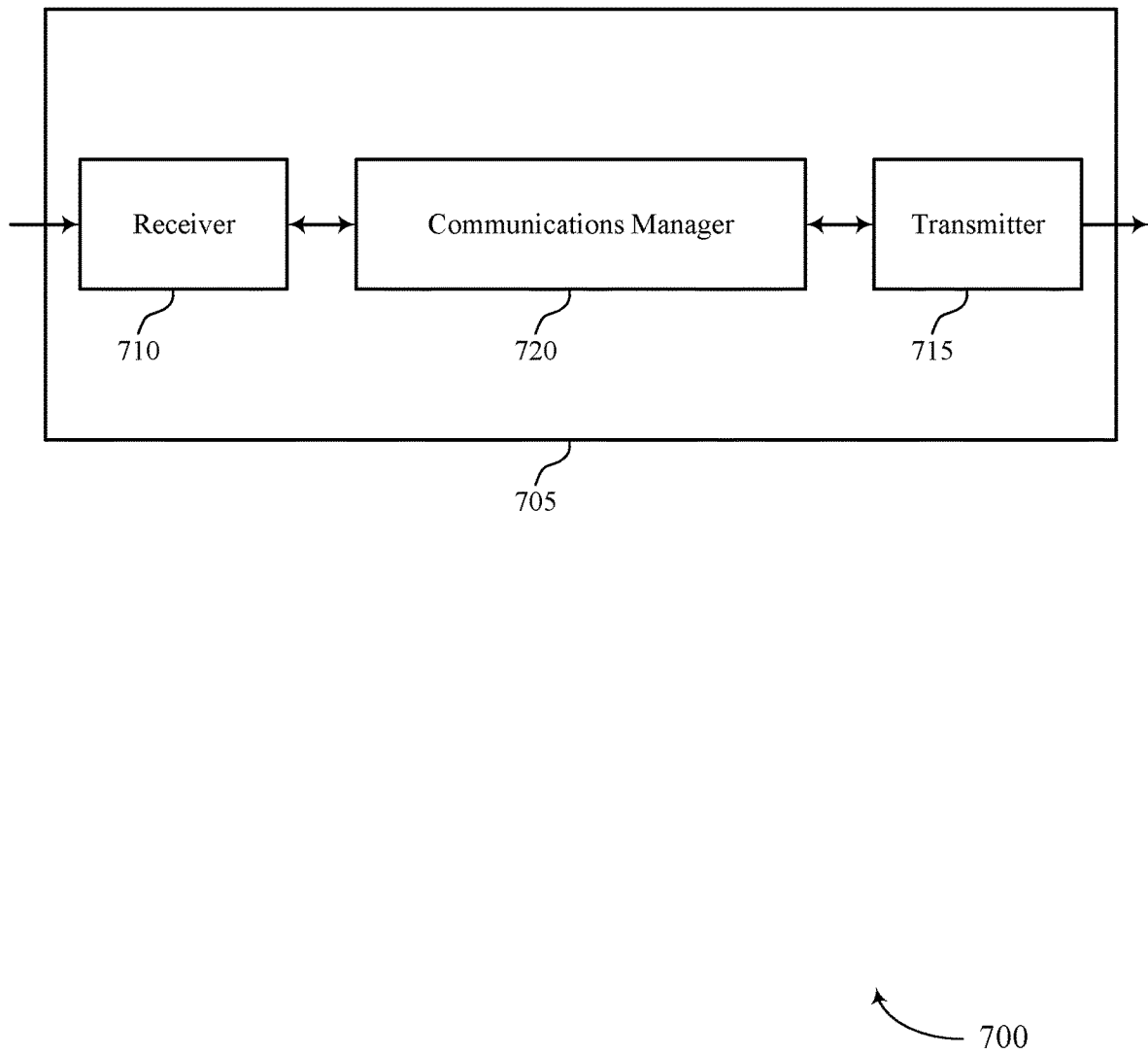
FIGS. 7 and 8 show block diagrams of devices in accordance with aspects of the present disclosure.

FIG. 7 shows a block diagram 700 of a device 705 in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to receiver protection in sidelink wireless systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to receiver protection in sidelink wireless systems). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of receiver protection in sidelink wireless systems as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving, from a second UE, an indication of a set of reserved resources for sidelink communications between the first UE and the second UE. The communications manager 720 may be configured as or otherwise support a means for transmitting, based on the indication of the set of reserved resources, a first control message for reservation reassurance of the set of reserved resources, the first control message including an indication of a resource configuration for a second control message for reservation reassurance of the set of reserved resources. The communications manager 720 may be configured as or otherwise support a means for transmitting the second control message based on the indication of the resource configuration, the second control message indicating the set of reserved resources for sidelink communications between the first UE and the second UE.

Additionally or alternatively, the communications manager 720 may support wireless communications at a first UE in accordance with examples as disclosed herein. For example, the communications manager 720 may be configured as or otherwise support a means for receiving, from a second UE, a first control message including an indication of a resource configuration for a second control message. The communications manager 720 may be configured as or otherwise support a means for monitoring for the second control message from the second UE based on the indication of the resource configuration, the second control message including an indication of a set of reserved resources for communications associated with the second UE. The communications manager 720 may be configured as or otherwise support a means for determining resources for communications by the first UE based on the indication of the set of reserved resources, where the resources for communications by the first UE are nonoverlapping with the set of reserved resources for communications associated with the second UE.

Additionally or alternatively, the communications manager 720 may support wireless communications at a first UE in accordance with examples as disclosed herein. For example, the communications manager 720 may be configured as or otherwise support a means for determining a set of resources for sidelink communications with a second UE. The communications manager 720 may be configured as or otherwise support a means for transmitting a first control message including a first indication of the set of resources. The communications manager 720 may be configured as or otherwise support a means for negotiating, with the second UE, a transmission occasion for resource reservation reassurance, the transmission occasion configured for transmission of a second indication of the set of resources by the second UE.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for improved communication reliability, improved coordination between devices, and reduced latency. For example, by retransmitting an indication of the reserved resources (e.g., after receiving the indication in a control message from a transmitting device), the device 705 may improve the probability that neighboring devices will receive the indication of the received resources, thereby reducing the likelihood of interference in the reserved resources. The described techniques may provide for the device 705 (e.g., a receiving UE 115, an S/A, or the like) to continue to monitor for transmissions (e.g., on a beam or a communication link) while transmitting the reservation reassurance, which may result in reduced latency. Additionally or alternatively, a transmitting device 705 may refrain from retransmitting the indication of the reserved resources, adjusting transmission techniques, or the like, if the device 705 performs the reservation reassurance, thereby resulting in reduced processing power and improving the efficiency of communications in the wireless communications system.

In some examples, if the device 705 is a transmitting device 705 (e.g., a transmitting UE 115, a PLC, or the like) that receives the first and second control messages, the device 705 may refrain from scheduling transmissions on the reserved resources, which may allow for more accurate communications and reduced latency. By refraining from transmitting on the reserved resources, the device 705 may avoid retransmitting transmissions, which may reduce power consumption by the device 705.

Figure 8:
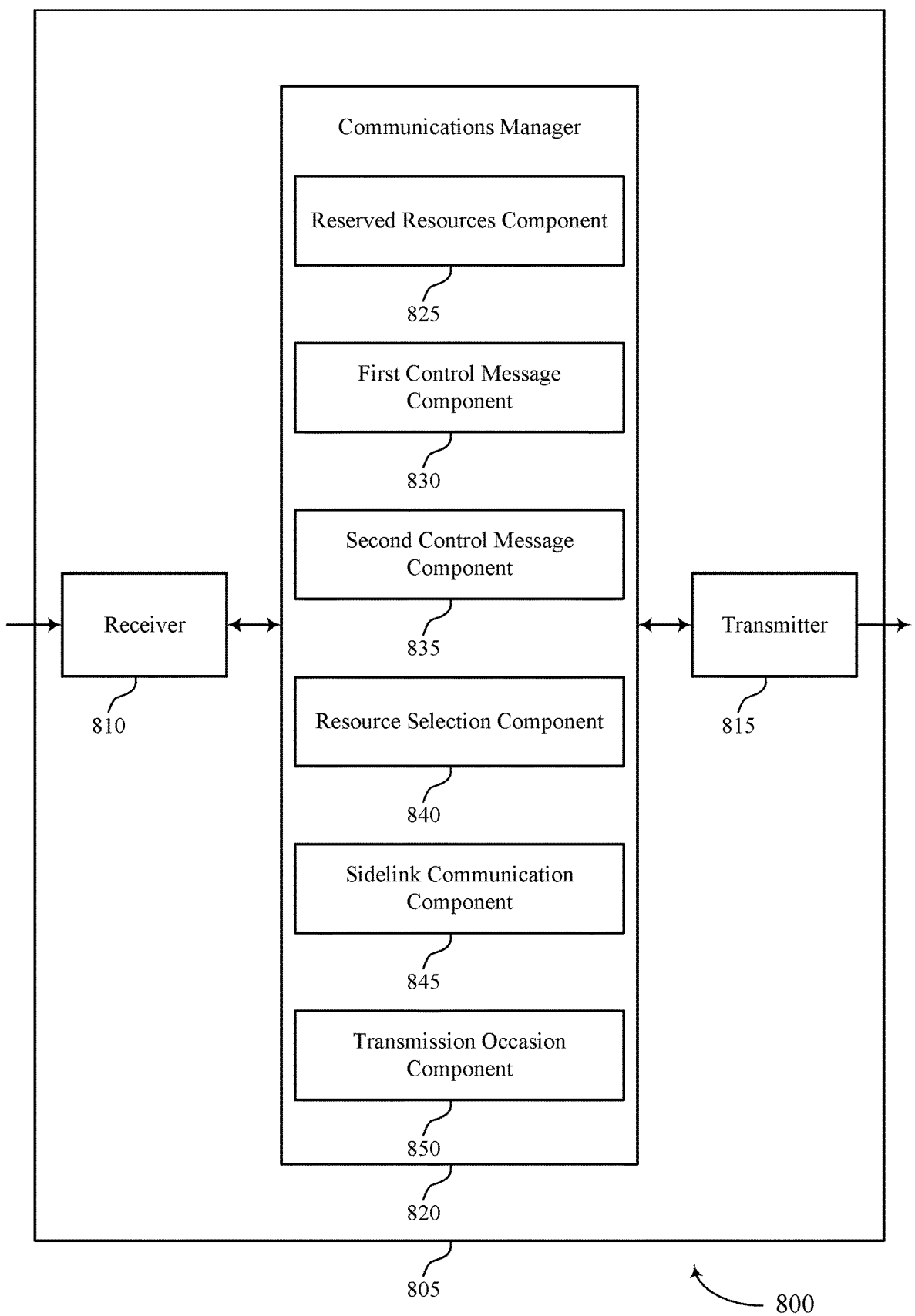

FIG. 8 shows a block diagram 800 of a device 805 in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to receiver protection in sidelink wireless systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to receiver protection in sidelink wireless systems). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of receiver protection in sidelink wireless systems as described herein. For example, the communications manager 820 may include a reserved resources component 825, a first control message component 830, a second control message component 835, a resource selection component 840, a sidelink communication component 845, a transmission occasion component 850, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The reserved resources component 825 may be configured as or otherwise support a means for receiving, from a second UE, an indication of a set of reserved resources for sidelink communications between the first UE and the second UE. The first control message component 830 may be configured as or otherwise support a means for transmitting, based on the indication of the set of reserved resources, a first control message for reservation reassurance of the set of reserved resources, the first control message including an indication of a resource configuration for a second control message for reservation reassurance of the set of reserved resources. The second control message component 835 may be configured as or otherwise support a means for transmitting the second control message based on the indication of the resource configuration, the second control message indicating the set of reserved resources for sidelink communications between the first UE and the second UE.

Additionally or alternatively, the communications manager 820 may support wireless communications at a first UE in accordance with examples as disclosed herein. The first control message component 830 may be configured as or otherwise support a means for receiving, from a second UE, a first control message including an indication of a resource configuration for a second control message. The second control message component 835 may be configured as or otherwise support a means for monitoring for the second control message from the second UE based on the indication of the resource configuration, the second control message including an indication of a set of reserved resources for communications associated with the second UE. The resource selection component 840 may be configured as or otherwise support a means for determining resources for communications by the first UE based on the indication of the set of reserved resources, where the resources for communications by the first UE are nonoverlapping with the set of reserved resources for communications associated with the second UE.

Additionally or alternatively, the communications manager 820 may support wireless communications at a first UE in accordance with examples as disclosed herein. The sidelink communication component 845 may be configured as or otherwise support a means for determining a set of resources for sidelink communications with a second UE. The first control message component 830 may be configured as or otherwise support a means for transmitting a first control message including a first indication of the set of resources. The transmission occasion component 850 may be configured as or otherwise support a means for negotiating, with the second UE, a transmission occasion for resource reservation reassurance, the transmission occasion configured for transmission of a second indication of the set of resources by the second UE.

Figure 9:
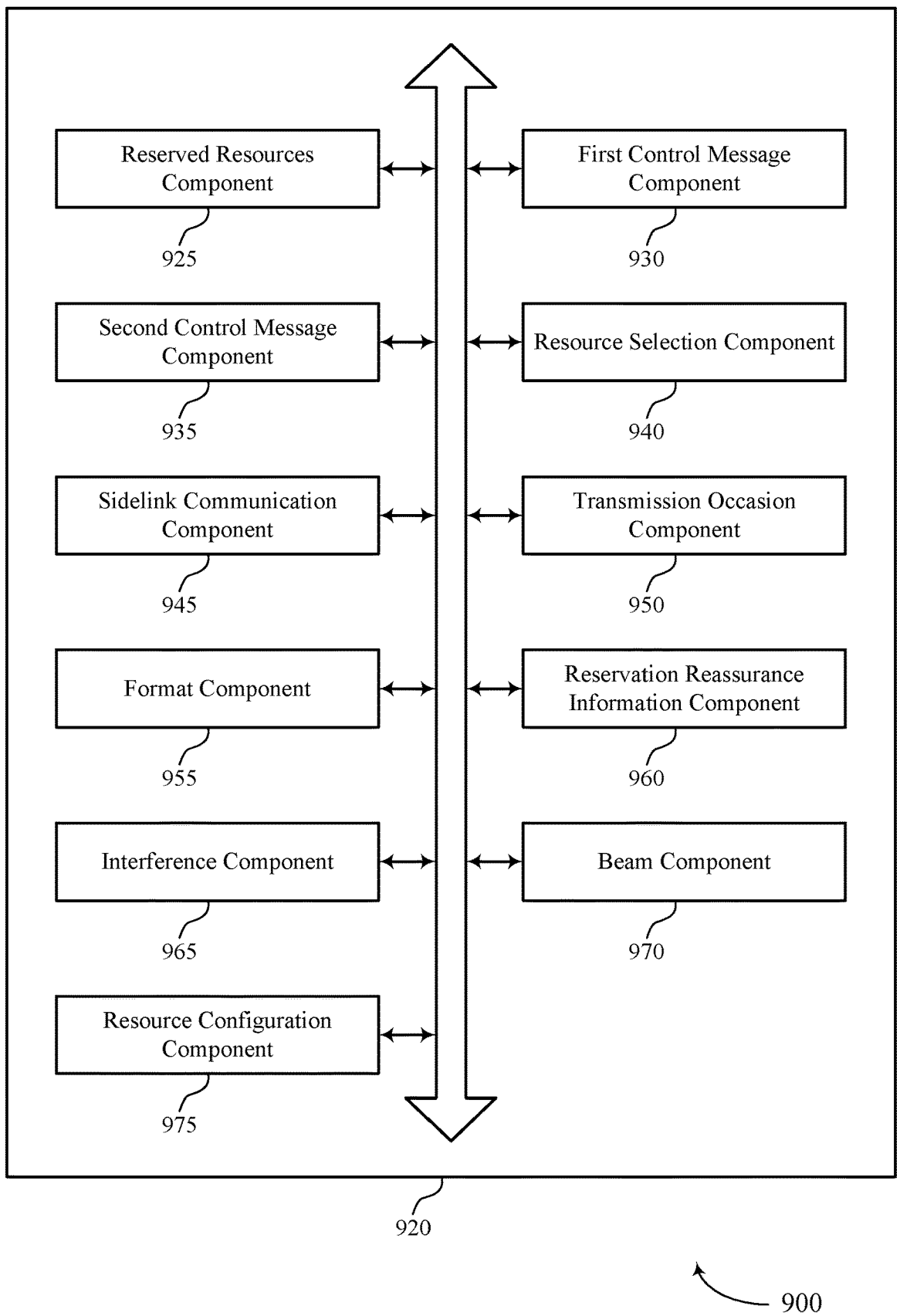
FIG. 9 shows a block diagram of a communications manager in accordance with aspects of the present disclosure.

FIG. 9 shows a block diagram 900 of a communications manager 920 in accordance with aspects of the present disclosure. The communications manager 920 may be an example of aspects of a communications manager 720, a communications manager 820, or both, as described herein. The communications manager 920, or various components thereof, may be an example of means for performing various aspects of receiver protection in sidelink wireless systems as described herein. For example, the communications manager 920 may include a reserved resources component 925, a first control message component 930, a second control message component 935, a resource selection component 940, a sidelink communication component 945, a transmission occasion component 950, a format component 955, a reservation reassurance information component 960, an interference component 965, a beam component 970, a resource configuration component 975, or any combination thereof. Each of these components may communicate, directly or indirectly, with one another (e.g., via one or more buses).

The communications manager 920 may support wireless communications at a first UE in accordance with examples as disclosed herein. The reserved resources component 925 may be configured as or otherwise support a means for receiving, from a second UE, an indication of a set of reserved resources for sidelink communications between the first UE and the second UE. The first control message component 930 may be configured as or otherwise support a means for transmitting, based on the indication of the set of reserved resources, a first control message for reservation reassurance of the set of reserved resources, the first control message including an indication of a resource configuration for a second control message for reservation reassurance of the set of reserved resources. The second control message component 935 may be configured as or otherwise support a means for transmitting the second control message based on the indication of the resource configuration, the second control message indicating the set of reserved resources for sidelink communications between the first UE and the second UE.

In some examples, the format component 955 may be configured as or otherwise support a means for transmitting an indication of a format of the second control message in the first control message.

In some examples, the format component 955 may be configured as or otherwise support a means for transmitting the indication of the format of the second control message in a first field of the first control message. In some examples, the resource configuration component 975 may be configured as or otherwise support a means for transmitting the indication of the resource configuration for the second control message in one or more other fields of the first control message.

In some examples, the format of the second control message is a configured format for reservation reassurance. In some examples, the configured format is associated with one or more types of reservation reassurance information for the set of reserved resources. In some examples, the resource configuration is based on a number of the one or more types of the reservation reassurance information. In some examples, the one or more types of the reservation reassurance information include a source identifier, a destination identifier, a reservation reassurance indication, a recommended resource indication, a sensing report, or a combination thereof.

In some examples, the configured format for reservation reassurance indicates that the number of the one or more types of the reservation reassurance information is a configured number. In some examples, the resource configuration component 975 may be configured as or otherwise support a means for transmitting, in one or more fields in the first control message, the resource configuration and an indication of the number of the one or more types of the reservation reassurance information.

In some examples, the first control message component 930 may be configured as or otherwise support a means for configuring one or more fields of the first control message for reservation reassurance. In some examples, the reservation reassurance information component 960 may be configured as or otherwise support a means for transmitting reservation reassurance information in the one or more fields of the first control message.

In some examples, the sidelink communication component 945 may be configured as or otherwise support a means for transmitting a second set of resources for a sidelink data channel in the second control message. In some examples, the reservation reassurance information component 960 may be configured as or otherwise support a means for transmitting reservation reassurance information for the set of reserved resources in the second set of resources for the sidelink data channel.

In some examples, the transmission occasion component 950 may be configured as or otherwise support a means for transmitting the first control message and the second control message according to a configured periodicity, the first control message or the second control message indicating the configured periodicity.

In some examples, the interference component 965 may be configured as or otherwise support a means for detecting interference on the set of reserved resources. In some examples, the interference component 965 may be configured as or otherwise support a means for transmitting the indication of the set of reserved resources based on detecting the interference.

In some examples, the transmission occasion component 950 may be configured as or otherwise support a means for determining a transmission occasion for transmitting the first control message and the second control message based on a negotiation procedure with the second UE or a third UE.

In some examples, the beam component 970 may be configured as or otherwise support a means for transmitting the first control message and the second control message using a same beam. In some examples, the interference component 965 may be configured as or otherwise support a means for detecting interference in the set of reserved resources during a time period. In some examples, the beam component 970 may be configured as or otherwise support a means for transmitting the first control message and the second control message using multiple beams according to a beam sweeping procedure based on the detected interference.

Additionally or alternatively, the communications manager 920 may support wireless communications at a first UE in accordance with examples as disclosed herein. In some examples, the first control message component 930 may be configured as or otherwise support a means for receiving, from a second UE, a first control message including an indication of a resource configuration for a second control message. In some examples, the second control message component 935 may be configured as or otherwise support a means for monitoring for the second control message from the second UE based on the indication of the resource configuration, the second control message including an indication of a set of reserved resources for communications associated with the second UE. The resource selection component 940 may be configured as or otherwise support a means for determining resources for communications by the first UE based on the indication of the set of reserved resources, where the resources for communications by the first UE are nonoverlapping with the set of reserved resources for communications associated with the second UE.

In some examples, the format component 955 may be configured as or otherwise support a means for identifying a format of the second control message based on an indication of the format in the first control message.

In some examples, the format component 955 may be configured as or otherwise support a means for identifying the format of the second control message based on a first field in the first control message. In some examples, the resource configuration component 975 may be configured as or otherwise support a means for identifying the resource configuration for the second control message based on a set of fields different from the first field in the first control message.

In some examples, the resource configuration component 975 may be configured as or otherwise support a means for determining that the resource configuration for the second control message is a configured resource configuration based on the format for reservation reassurance.

In some examples, the reservation reassurance information component 960 may be configured as or otherwise support a means for identifying, based on the format and the resource configuration, a number of types of reservation reassurance information included in the second control message and a number of time and frequency resources for receiving the second control message. In some examples, the reservation reassurance information component 960 may be configured as or otherwise support a means for receiving the second control message including the indication of the set of reserved resources and the reservation reassurance information based on the identifying. In some examples, the types of the reservation reassurance information include one or more of a source identifier, a destination identifier, a reservation reassurance indication, a recommended resource indication, a sensing report, or a combination thereof.

In some examples, to support determining the resources for communications by the first UE, the sidelink communication component 945 may be configured as or otherwise support a means for determining the resources for communications by the first UE based on the indication of the set of reserved resources and the reservation reassurance information.

In some examples, the resource selection component 940 may be configured as or otherwise support a means for identifying available resources in a subchannel, where the available resources in the subchannel are nonoverlapping with time and frequency resources for the second control message indicated by the resource configuration. In some examples, the sidelink communication component 945 may be configured as or otherwise support a means for transmitting data in the available resources based on the identifying.

Additionally or alternatively, the communications manager 920 may support wireless communications at a first UE in accordance with examples as disclosed herein. The sidelink communication component 945 may be configured as or otherwise support a means for determining a set of resources for sidelink communications with a second UE. In some examples, the first control message component 930 may be configured as or otherwise support a means for transmitting a first control message including a first indication of the set of resources. The transmission occasion component 950 may be configured as or otherwise support a means for negotiating, with the second UE, a transmission occasion for resource reservation reassurance, the transmission occasion configured for transmission of a second indication of the set of resources by the second UE.

In some examples, the transmission occasion indicates a second set of resources in a subchannel for a second control message including the second indication of the set of reserved resources.

In some examples, the sidelink communication component 945 may be configured as or otherwise support a means for identifying available resources in the subchannel, where the available resources are nonoverlapping with the second set of resources for the second control message. In some examples, the sidelink communication component 945 may be configured as or otherwise support a means for performing sidelink communications using the available resources.

Figure 10:
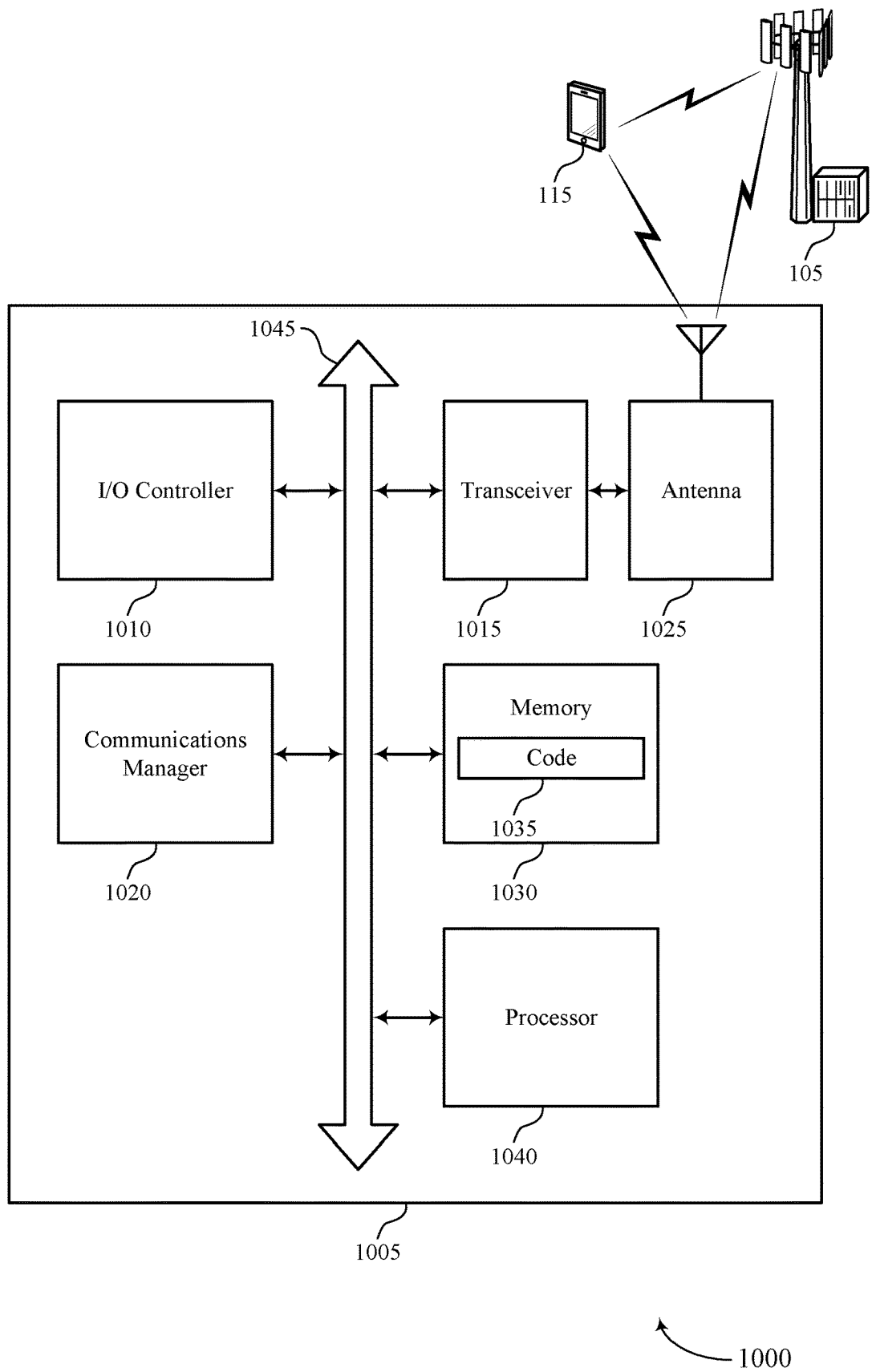
FIG. 10 shows a diagram of a system including a device in accordance with aspects of the present disclosure.

FIG. 10 shows a diagram of a system 1000 including a device 1005 in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting receiver protection in sidelink wireless systems). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving, from a second UE, an indication of a set of reserved resources for sidelink communications between the first UE and the second UE. The communications manager 1020 may be configured as or otherwise support a means for transmitting, based on the indication of the set of reserved resources, a first control message for reservation reassurance of the set of reserved resources, the first control message including an indication of a resource configuration for a second control message for reservation reassurance of the set of reserved resources. The communications manager 1020 may be configured as or otherwise support a means for transmitting the second control message based on the indication of the resource configuration, the second control message indicating the set of reserved resources for sidelink communications between the first UE and the second UE.

Additionally or alternatively, the communications manager 1020 may support wireless communications at a first UE in accordance with examples as disclosed herein. For example, the communications manager 1020 may be configured as or otherwise support a means for receiving, from a second UE, a first control message including an indication of a resource configuration for a second control message. The communications manager 1020 may be configured as or otherwise support a means for monitoring for the second control message from the second UE based on the indication of the resource configuration, the second control message including an indication of a set of reserved resources for communications associated with the second UE. The communications manager 1020 may be configured as or otherwise support a means for determining resources for communications by the first UE based on the indication of the set of reserved resources, where the resources for communications by the first UE are nonoverlapping with the set of reserved resources for communications associated with the second UE.

Additionally or alternatively, the communications manager 1020 may support wireless communications at a first UE in accordance with examples as disclosed herein. For example, the communications manager 1020 may be configured as or otherwise support a means for determining a set of resources for sidelink communications with a second UE. The communications manager 1020 may be configured as or otherwise support a means for transmitting a first control message including a first indication of the set of resources. The communications manager 1020 may be configured as or otherwise support a means for negotiating, with the second UE, a transmission occasion for resource reservation reassurance, the transmission occasion configured for transmission of a second indication of the set of resources by the second UE.

By including or configuring the communications manager 1020 in accordance with examples as described herein, the device 1005 may support techniques for more efficient utilization of communication resources and reduced processing latency. For example, by transmitting the reservation reassurance, a processor of the device 1005 (e.g., a client UE 115, an S/A, or the like) may reduce the interference received at the device 1005, which may allow for the processor to decode communications more efficiently and accurately. Additionally or alternatively, the described techniques provide for one or more resource configurations for transmitting the reservation reassurance, which may allow for the processor to efficiently use resources which may be otherwise empty or unused resources.

In some examples, if the device 1005 is a transmitting device 1005 (e.g., an anchor UE 115, a PLC, or the like), a processor of the device 1005 may efficiently schedule resources for transmissions by the device 1005 by receiving the indication of resources that are reserved for transmissions by another device. The processor may refrain from monitoring for additional resources once the processor receives the reservation reassurance and the indication of the reserved resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of receiver protection in sidelink wireless systems as described herein, or the processor 1040 and the memory 1030 may be otherwise configured to perform or support such operations.

Figure 11:
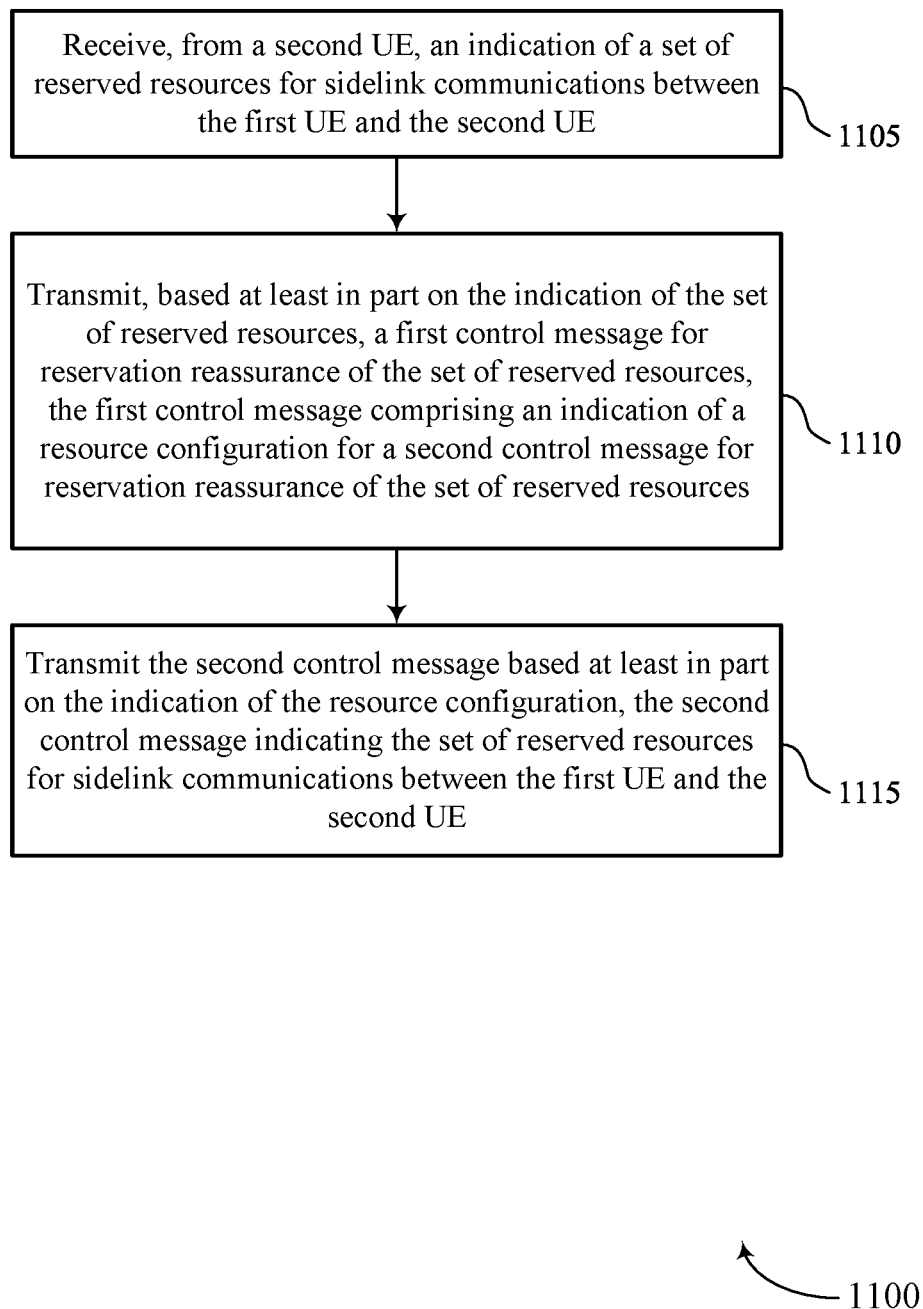
FIGS. 11 through 16 show flowcharts illustrating methods in accordance with aspects of the present disclosure.

FIG. 11 shows a flowchart illustrating a method 1100 in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving, from a second UE, an indication of a set of reserved resources for sidelink communications between the first UE and the second UE. The operations of 1105 may be performed in accordance with examples as disclosed herein. In some examples, aspects of the operations of 1105 may be performed by a reserved resources component 925 as described with reference to FIG. 9.

At 1110, the method may include transmitting, based on the indication of the set of reserved resources, a first control message for reservation reassurance of the set of reserved resources, the first control message including an indication of a resource configuration for a second control message for reservation reassurance of the set of reserved resources. The operations of 1110 may be performed in accordance with examples as disclosed herein. In some examples, aspects of the operations of 1110 may be performed by a first control message component 930 as described with reference to FIG. 9.

At 1115, the method may include transmitting the second control message based on the indication of the resource configuration, the second control message indicating the set of reserved resources for sidelink communications between the first UE and the second UE. The operations of 1115 may be performed in accordance with examples as disclosed herein. In some examples, aspects of the operations of 1115 may be performed by a second control message component 935 as described with reference to FIG. 9.

Figure 12:
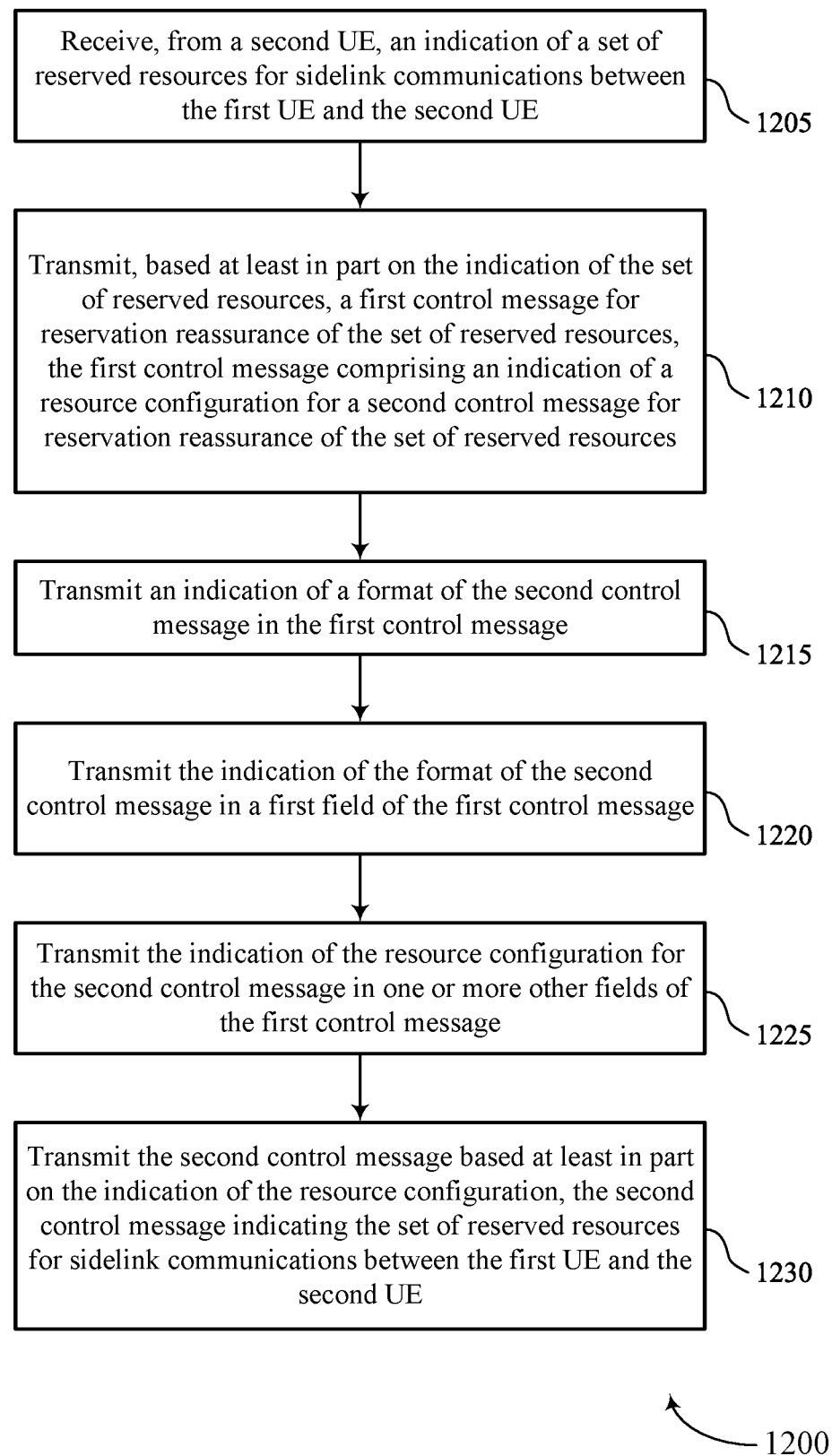

FIG. 12 shows a flowchart illustrating a method 1200 in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, from a second UE, an indication of a set of reserved resources for sidelink communications between the first UE and the second UE. The operations of 1205 may be performed in accordance with examples as disclosed herein. In some examples, aspects of the operations of 1205 may be performed by a reserved resources component 925 as described with reference to FIG. 9.

At 1210, the method may include transmitting, based on the indication of the set of reserved resources, a first control message for reservation reassurance of the set of reserved resources, the first control message including an indication of a resource configuration for a second control message for reservation reassurance of the set of reserved resources. The operations of 1210 may be performed in accordance with examples as disclosed herein. In some examples, aspects of the operations of 1210 may be performed by a first control message component 930 as described with reference to FIG. 9.

At 1215, the method may include transmitting an indication of a format of the second control message in the first control message. The operations of 1215 may be performed in accordance with examples as disclosed herein. In some examples, aspects of the operations of 1215 may be performed by a format component 955 as described with reference to FIG. 9.

At 1220, the method may include transmitting the indication of the format of the second control message in a first field of the first control message. The operations of 1220 may be performed in accordance with examples as disclosed herein. In some examples, aspects of the operations of 1220 may be performed by a format component 955 as described with reference to FIG. 9.

At 1225, the method may include transmitting the indication of the resource configuration for the second control message in one or more other fields of the first control message. The operations of 1225 may be performed in accordance with examples as disclosed herein. In some examples, aspects of the operations of 1225 may be performed by a resource configuration component 975 as described with reference to FIG. 9.

At 1230, the method may include transmitting the second control message based on the indication of the resource configuration, the second control message indicating the set of reserved resources for sidelink communications between the first UE and the second UE. The operations of 1230 may be performed in accordance with examples as disclosed herein. In some examples, aspects of the operations of 1230 may be performed by a second control message component 935 as described with reference to FIG. 9.

Figure 13:
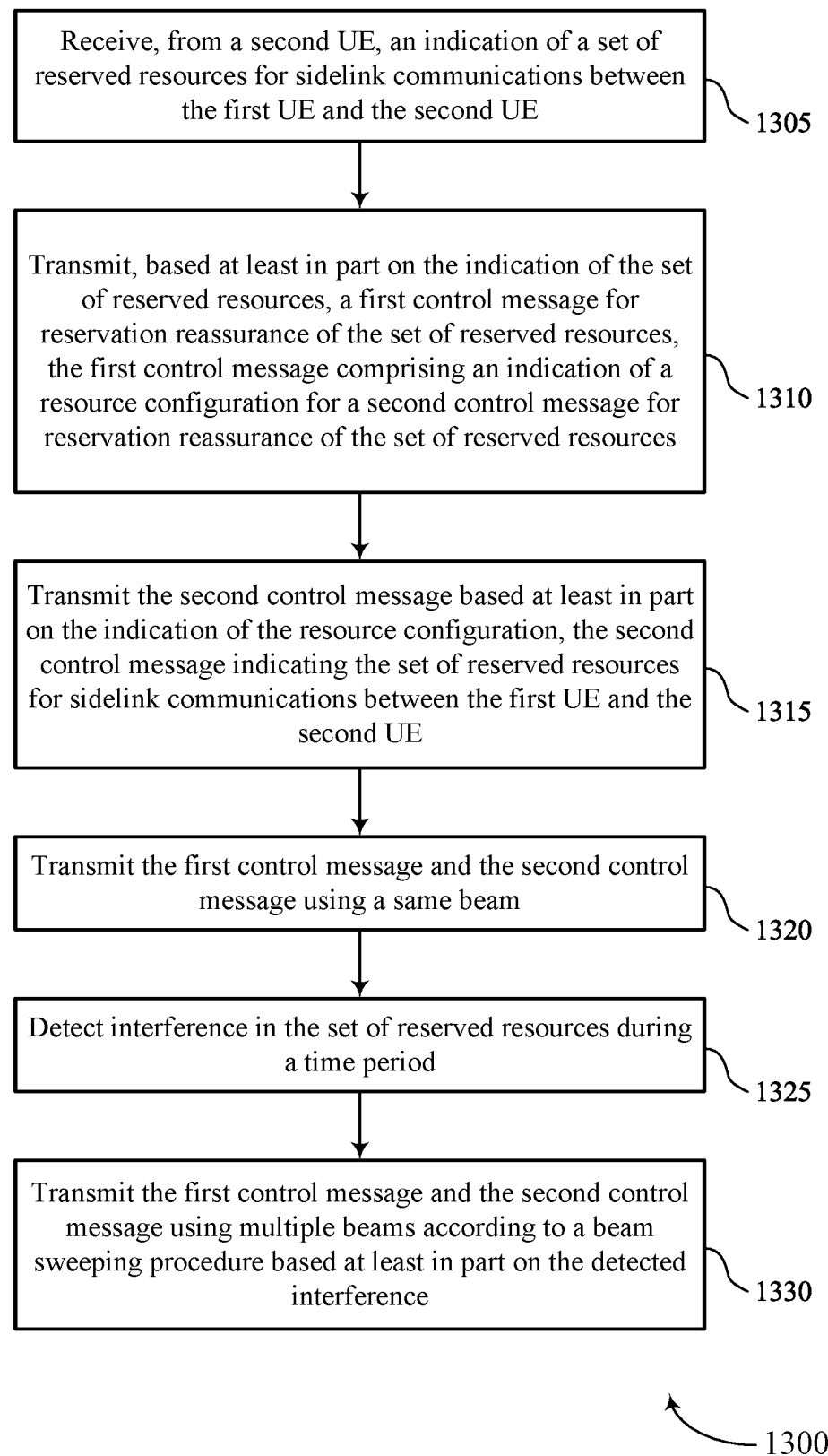

FIG. 13 shows a flowchart illustrating a method 1300 in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, from a second UE, an indication of a set of reserved resources for sidelink communications between the first UE and the second UE. The operations of 1305 may be performed in accordance with examples as disclosed herein. In some examples, aspects of the operations of 1305 may be performed by a reserved resources component 925 as described with reference to FIG. 9.

At 1310, the method may include transmitting, based on the indication of the set of reserved resources, a first control message for reservation reassurance of the set of reserved resources, the first control message including an indication of a resource configuration for a second control message for reservation reassurance of the set of reserved resources. The operations of 1310 may be performed in accordance with examples as disclosed herein. In some examples, aspects of the operations of 1310 may be performed by a first control message component 930 as described with reference to FIG. 9.

At 1315, the method may include transmitting the second control message based on the indication of the resource configuration, the second control message indicating the set of reserved resources for sidelink communications between the first UE and the second UE. The operations of 1315 may be performed in accordance with examples as disclosed herein. In some examples, aspects of the operations of 1315 may be performed by a second control message component 935 as described with reference to FIG. 9.

At 1320, the method may include transmitting the first control message and the second control message using a same beam. The operations of 1320 may be performed in accordance with examples as disclosed herein. In some examples, aspects of the operations of 1320 may be performed by a beam component 970 as described with reference to FIG. 9.

At 1325, the method may include detecting interference in the set of reserved resources during a time period. The operations of 1325 may be performed in accordance with examples as disclosed herein. In some examples, aspects of the operations of 1325 may be performed by an interference component 965 as described with reference to FIG. 9.

At 1330, the method may include transmitting the first control message and the second control message using multiple beams according to a beam sweeping procedure based on the detected interference. The operations of 1330 may be performed in accordance with examples as disclosed herein. In some examples, aspects of the operations of 1330 may be performed by a beam component 970 as described with reference to FIG. 9.

Figure 14:
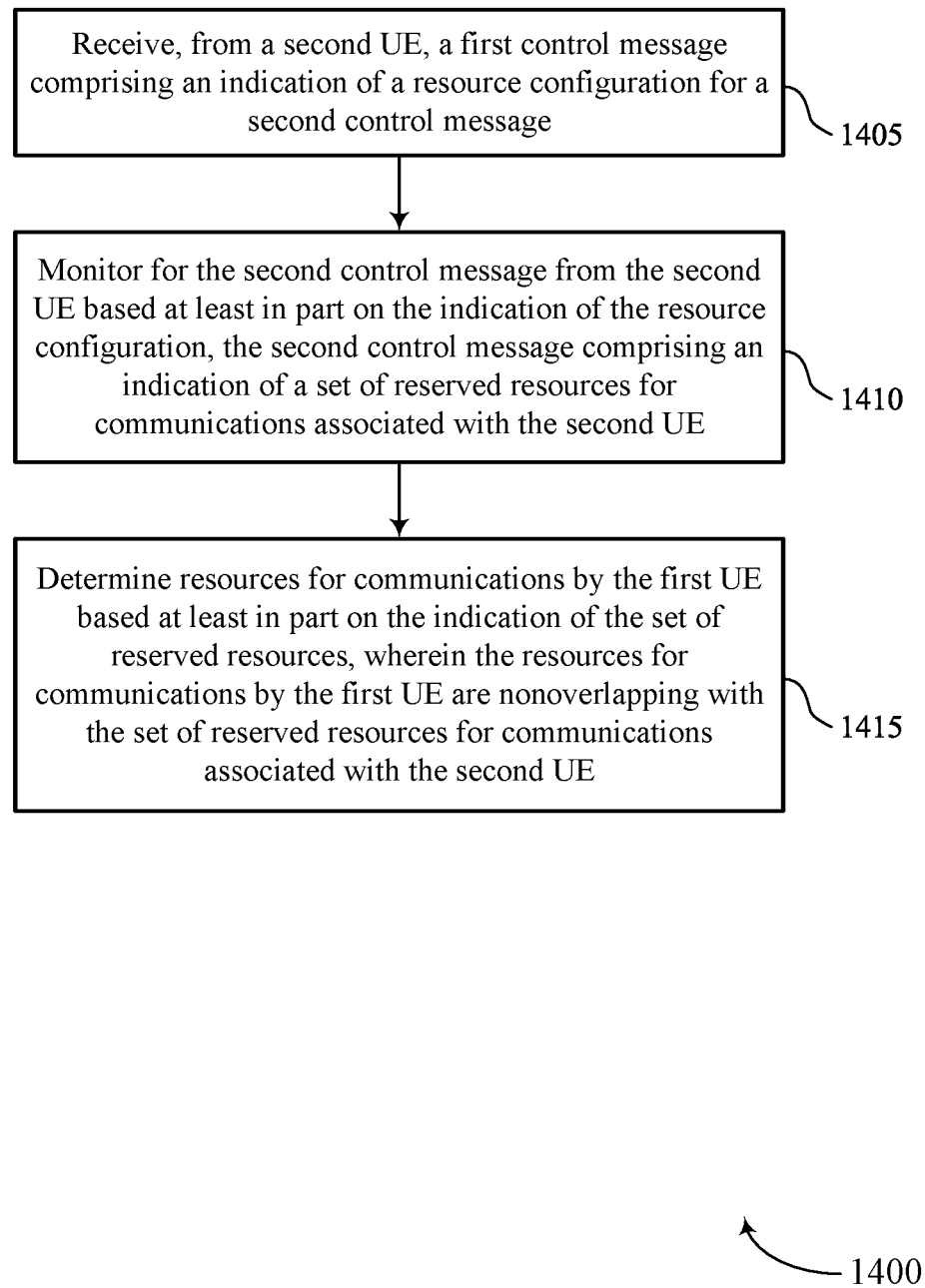

FIG. 14 shows a flowchart illustrating a method 1400 in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving, from a second UE, a first control message including an indication of a resource configuration for a second control message. The operations of 1405 may be performed in accordance with examples as disclosed herein. In some examples, aspects of the operations of 1405 may be performed by a first control message component 930 as described with reference to FIG. 9.

At 1410, the method may include monitoring for the second control message from the second UE based on the indication of the resource configuration, the second control message including an indication of a set of reserved resources for communications associated with the second UE. The operations of 1410 may be performed in accordance with examples as disclosed herein. In some examples, aspects of the operations of 1410 may be performed by a second control message component 935 as described with reference to FIG. 9.

At 1415, the method may include determining resources for communications by the first UE based on the indication of the set of reserved resources, where the resources for communications by the first UE are nonoverlapping with the set of reserved resources for communications associated with the second UE. The operations of 1415 may be performed in accordance with examples as disclosed herein. In some examples, aspects of the operations of 1415 may be performed by a resource selection component 940 as described with reference to FIG. 9.

Figure 15:
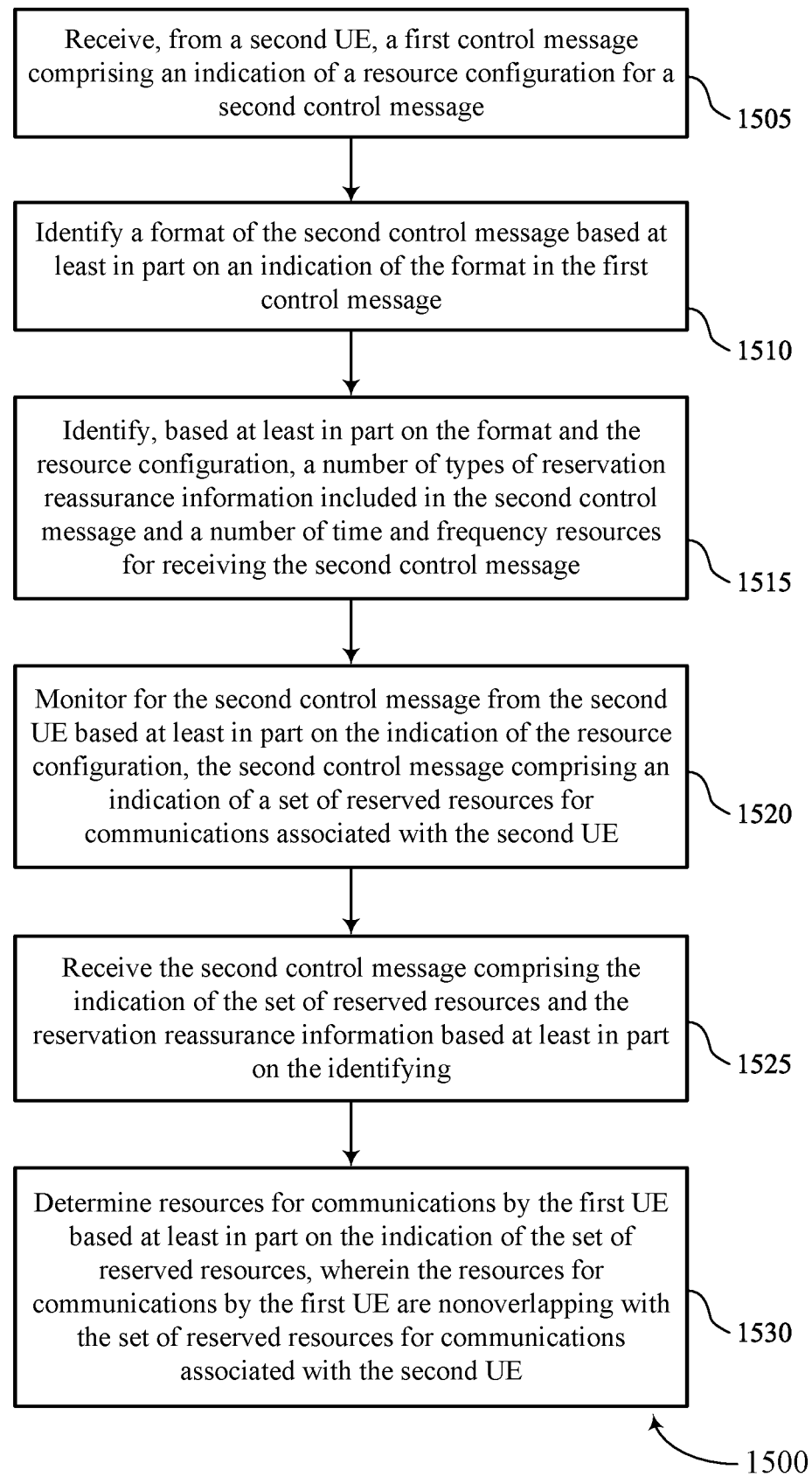

FIG. 15 shows a flowchart illustrating a method 1500 in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a second UE, a first control message including an indication of a resource configuration for a second control message. The operations of 1505 may be performed in accordance with examples as disclosed herein. In some examples, aspects of the operations of 1505 may be performed by a first control message component 930 as described with reference to FIG. 9.

At 1510, the method may include identifying a format of the second control message based on an indication of the format in the first control message. The operations of 1510 may be performed in accordance with examples as disclosed herein. In some examples, aspects of the operations of 1510 may be performed by a format component 955 as described with reference to FIG. 9.

At 1515, the method may include identifying, based on the format and the resource configuration, a number of types of reservation reassurance information included in the second control message and a number of time and frequency resources for receiving the second control message. The operations of 1515 may be performed in accordance with examples as disclosed herein. In some examples, aspects of the operations of 1515 may be performed by a reservation reassurance information component 960 as described with reference to FIG. 9.

At 1520, the method may include monitoring for the second control message from the second UE based on the indication of the resource configuration, the second control message including an indication of a set of reserved resources for communications associated with the second UE. The operations of 1520 may be performed in accordance with examples as disclosed herein. In some examples, aspects of the operations of 1520 may be performed by a second control message component 935 as described with reference to FIG. 9.

At 1525, the method may include receiving the second control message including the indication of the set of reserved resources and the reservation reassurance information based on the identifying. The operations of 1525 may be performed in accordance with examples as disclosed herein. In some examples, aspects of the operations of 1525 may be performed by a reservation reassurance information component 960 as described with reference to FIG. 9.

At 1530, the method may include determining resources for communications by the first UE based on the indication of the set of reserved resources, where the resources for communications by the first UE are nonoverlapping with the set of reserved resources for communications associated with the second UE. The operations of 1530 may be performed in accordance with examples as disclosed herein. In some examples, aspects of the operations of 1530 may be performed by a resource selection component 940 as described with reference to FIG. 9.

Figure 16:
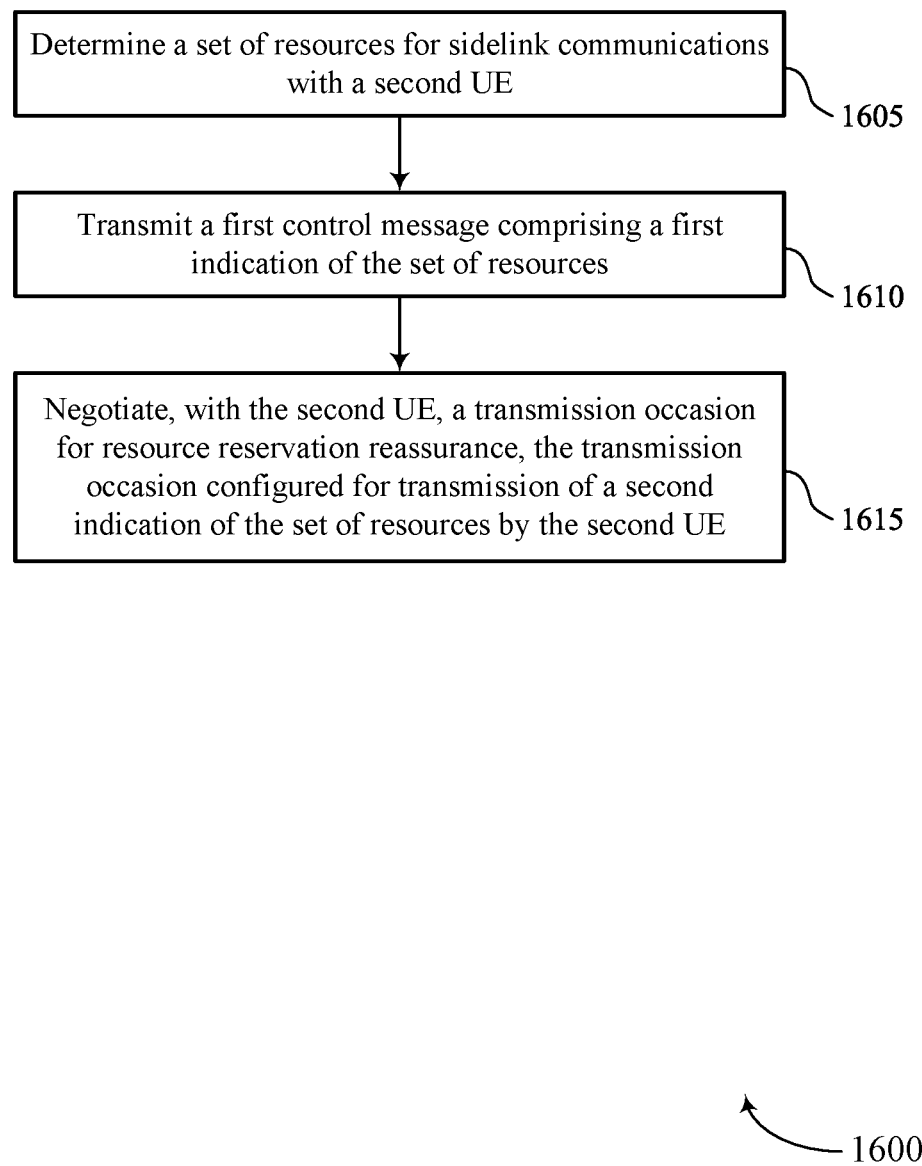

FIG. 16 shows a flowchart illustrating a method 1600 in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include determining a set of resources for sidelink communications with a second UE. The operations of 1605 may be performed in accordance with examples as disclosed herein. In some examples, aspects of the operations of 1605 may be performed by a sidelink communication component 945 as described with reference to FIG. 9.

At 1610, the method may include transmitting a first control message including a first indication of the set of resources. The operations of 1610 may be performed in accordance with examples as disclosed herein. In some examples, aspects of the operations of 1610 may be performed by a first control message component 930 as described with reference to FIG. 9.

At 1615, the method may include negotiating, with the second UE, a transmission occasion for resource reservation reassurance, the transmission occasion configured for transmission of a second indication of the set of resources by the second UE. The operations of 1615 may be performed in accordance with examples as disclosed herein. In some examples, aspects of the operations of 1615 may be performed by a transmission occasion component 950 as described with reference to FIG. 9.

SUMMARY OF ASPECTS

The following provides an overview of aspects of the present disclosure:

Aspect 1: A method for wireless communications at a first UE, comprising: receiving, from a second UE, an indication of a set of reserved resources for sidelink communications between the first UE and the second UE; transmitting, based at least in part on the indication of the set of reserved resources, a first control message for reservation reassurance of the set of reserved resources, the first control message comprising an indication of a resource configuration for a second control message for reservation reassurance of the set of reserved resources; and transmitting the second control message based at least in part on the indication of the resource configuration, the second control message indicating the set of reserved resources for sidelink communications between the first UE and the second UE.

Aspect 2: The method of aspect 1, further comprising: transmitting an indication of a format of the second control message in the first control message.

Aspect 3: The method of aspect 2, further comprising: transmitting the indication of the format of the second control message in a first field of the first control message; and transmitting the indication of the resource configuration for the second control message in one or more other fields of the first control message.

Aspect 4: The method of any of aspects 2 through 3, wherein the format of the second control message is a configured format for reservation reassurance; the configured format is associated with one or more types of reservation reassurance information for the set of reserved resources; and the resource configuration is based at least in part on a number of the one or more types of the reservation reassurance information.

Aspect 5: The method of aspect 4, wherein the one or more types of the reservation reassurance information comprise a source ID, a destination ID, a reservation reassurance indication, a recommended resource indication, a sensing report, or a combination thereof.

Aspect 6: The method of any of aspects 4 through 5, wherein the configured format for reservation reassurance indicates that the number of the one or more types of the reservation reassurance information is a configured number.

Aspect 7: The method of any of aspects 4 through 5, further comprising: transmitting, in one or more fields in the first control message, the resource configuration and an indication of the number of the one or more types of the reservation reassurance information.

Aspect 8: The method of any of aspects 1 through 7, further comprising: configuring one or more fields of the first control message for reservation reassurance; and transmitting reservation reassurance information in the one or more fields of the first control message.

Aspect 9: The method of any of aspects 1 through 8, further comprising: transmitting a second set of resources for a sidelink data channel in the second control message; and transmitting reservation reassurance information for the set of reserved resources in the second set of resources for the sidelink data channel.

Aspect 10: The method of any of aspects 1 through 9, further comprising: transmitting the first control message and the second control message according to a configured periodicity, the first control message or the second control message indicating the configured periodicity.

Aspect 11: The method of any of aspects 1 through 9, further comprising: detecting interference on the set of reserved resources; and transmitting the indication of the set of reserved resources based at least in part on detecting the interference.

Aspect 12: The method of any of aspects 1 through 11, further comprising: determining a transmission occasion for transmitting the first control message and the second control message based at least in part on a negotiation procedure with the second UE or a third UE.

Aspect 13: The method of any of aspects 1 through 12, further comprising: transmitting the first control message and the second control message using a same beam.

Aspect 14: The method of any of aspects 1 through 12, further comprising: detecting interference in the set of reserved resources during a time period; and transmitting the first control message and the second control message using multiple beams according to a beam sweeping procedure based at least in part on the detected interference.

Aspect 15: A method for wireless communications at a first UE, comprising: receiving, from a second UE, a first control message comprising an indication of a resource configuration for a second control message; monitoring for the second control message from the second UE based at least in part on the indication of the resource configuration, the second control message comprising an indication of a set of reserved resources for communications associated with the second UE; and determining resources for communications by the first UE based at least in part on the indication of the set of reserved resources, wherein the resources for communications by the first UE are nonoverlapping with the set of reserved resources for communications associated with the second UE.

Aspect 16: The method of aspect 15, further comprising: identifying a format of the second control message based at least in part on an indication of the format in the first control message.

Aspect 17: The method of aspect 16, further comprising: identifying the format of the second control message based at least in part on a first field in the first control message; and identifying the resource configuration for the second control message based at least in part on a set of fields different from the first field in the first control message.

Aspect 18: The method of aspect 16, further comprising: determining that the resource configuration for the second control message is a configured resource configuration based at least in part on the format for reservation reassurance.

Aspect 19: The method of any of aspects 16 through 18, further comprising: identifying, based at least in part on the format and the resource configuration, a number of types of reservation reassurance information included in the second control message and a number of time and frequency resources for receiving the second control message; and receiving the second control message comprising the indication of the set of reserved resources and the reservation reassurance information based at least in part on the identifying.

Aspect 20: The method of aspect 19, wherein the types of the reservation reassurance information comprise one or more of a source ID, a destination ID, a reservation reassurance indication, a recommended resource indication, a sensing report, or a combination thereof.

Aspect 21: The method of any of aspects 19 through 20, wherein determining the resources for communications by the first UE further comprises: determining the resources for communications by the first UE based at least in part on the indication of the set of reserved resources and the reservation reassurance information.

Aspect 22: The method of any of aspects 15 through 21, further comprising: identifying available resources in a subchannel, wherein the available resources in the subchannel are nonoverlapping with time and frequency resources for the second control message indicated by the resource configuration; and transmitting data in the available resources based at least in part on the identifying.

Aspect 23: A method for wireless communications at a first UE, the method comprising: determining a set of resources for sidelink communications with a second UE; transmitting a first control message comprising a first indication of the set of resources; and negotiating, with the second UE, a transmission occasion for resource reservation reassurance, the transmission occasion configured for transmission of a second indication of the set of resources by the second UE.

Aspect 24: The method of aspect 23, wherein the transmission occasion indicates a second set of resources in a subchannel for a second control message comprising the second indication of the set of reserved resources.

Aspect 25: The method of aspect 24, further comprising: identifying available resources in the subchannel, wherein the available resources are nonoverlapping with the second set of resources for the second control message; and performing sidelink communications using the available resources.

Aspect 26: An apparatus for wireless communications at a first UE, comprising a processor; memory coupled with the processor; and instructions stored in the memory and executable by the processor to cause the apparatus to perform a method of any of aspects 1 through 14.

Aspect 27: An apparatus for wireless communications at a first UE, comprising at least one means for performing a method of any of aspects 1 through 14.

Aspect 28: A non-transitory computer-readable medium storing code for wireless communications at a first UE, the code comprising instructions executable by a processor to perform a method of any of aspects 1 through 14.

Aspect 29: An apparatus for wireless communications at a first UE, comprising a processor; memory coupled with the processor; and instructions stored in the memory and executable by the processor to cause the apparatus to perform a method of any of aspects 15 through 22.

Aspect 30: An apparatus for wireless communications at a first UE, comprising at least one means for performing a method of any of aspects 15 through 22.

Aspect 31: A non-transitory computer-readable medium storing code for wireless communications at a first UE, the code comprising instructions executable by a processor to perform a method of any of aspects 15 through 22.

Aspect 32: An apparatus for wireless communications at a first UE, comprising a processor; memory coupled with the processor; and instructions stored in the memory and executable by the processor to cause the apparatus to perform a method of any of aspects 23 through 25.

Aspect 33: An apparatus for wireless communications at a first UE, comprising at least one means for performing a method of any of aspects 23 through 25.

Aspect 34: A non-transitory computer-readable medium storing code for wireless communications at a first UE, the code comprising instructions executable by a processor to perform a method of any of aspects 23 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first UE, comprising:
   receiving, from a second UE, an indication of a set of reserved resources for sidelink communications between the first UE and the second UE;
   transmitting, based on receiving the indication of the set of reserved resources from the second UE, a first control message for reservation reassurance of the set of reserved resources, the first control message comprising an indication of a resource configuration for a second control message for reservation reassurance of the set of reserved resources; and
   transmitting the second control message based at least in part on the indication of the resource configuration, the second control message indicating the set of reserved resources for sidelink communications between the first UE and the second UE.

2. The method of claim 1, further comprising:
   transmitting an indication of a format of the second control message in the first control message.

3. The method of claim 2, further comprising:
   transmitting the indication of the format of the second control message in a first field of the first control message; and
   transmitting the indication of the resource configuration for the second control message in one or more other fields of the first control message.

4. The method of claim 2, wherein:
   the format of the second control message is a configured format for reservation reassurance;
   the configured format is associated with one or more types of reservation reassurance information for the set of reserved resources; and
   the resource configuration is based at least in part on a number of the one or more types of the reservation reassurance information.

5. The method of claim 4, wherein the one or more types of the reservation reassurance information comprise a source identifier, a destination identifier, a reservation reassurance indication, a recommended resource indication, a sensing report, or a combination thereof.

6. The method of claim 4, wherein the configured format for reservation reassurance indicates that the number of the one or more types of the reservation reassurance information is a configured number.

7. The method of claim 4, further comprising:
   transmitting, in one or more fields in the first control message, the resource configuration and an indication of the number of the one or more types of the reservation reassurance information.

8. The method of claim 1, further comprising:
   configuring one or more fields of the first control message for reservation reassurance; and
   transmitting reservation reassurance information in the one or more fields of the first control message.

9. The method of claim 1, further comprising:
   transmitting a second set of resources for a sidelink data channel in the second control message; and
   transmitting reservation reassurance information for the set of reserved resources in the second set of resources for the sidelink data channel.

10. The method of claim 1, further comprising:
    transmitting the first control message and the second control message according to a configured periodicity, the first control message or the second control message indicating the configured periodicity.

11. The method of claim 1, further comprising:
    detecting interference on the set of reserved resources; and
    transmitting the indication of the set of reserved resources based at least in part on detecting the interference.

12. The method of claim 1, further comprising:
    performing a negotiation procedure with the second UE or a third UE, wherein a transmission occasion for transmitting the first control message and the second control message is based at least in part on the negotiation procedure with the second UE or the third UE.

13. The method of claim 1, further comprising:
    transmitting the first control message and the second control message using a same beam.

14. The method of claim 1, further comprising:
    detecting interference in the set of reserved resources during a time period; and
    transmitting the first control message and the second control message using multiple beams according to a beam sweeping procedure based at least in part on the detected interference.

15. A method for wireless communications at a first UE, comprising:
    receiving, from a second UE, a first control message comprising an indication of a resource configuration for a second control message;
    monitoring for the second control message from the second UE based at least in part on the indication of the resource configuration, the second control message comprising an indication of a set of reserved resources for communications by a third UE; and
    performing sidelink communications using resources that are nonoverlapping with the set of reserved resources for the communications by the third UE, wherein the resources are determined by the first UE based at least in part on the indication of the set of reserved resources, wherein the resources for communications by the first UE are nonoverlapping with the set of reserved resources for communications associated with the second UE.

16. The method of claim 15, wherein receiving the first control message comprises:
    receiving an indication of a format of the second control message, wherein the format of the second control message is based at least in part on the indication of the format in the first control message.

17. The method of claim 16, wherein receiving the first control message comprises:
receiving, via a first field in the first control message, the indication of the format of the second control message; and
receiving, via a set of fields different from the first field in the first control message, the resource configuration for the second control message.

18. The method of claim 16,
wherein the resource configuration for the second control message is a configured resource configuration based at least in part on the format for reservation reassurance.

19. The method of claim 16, further comprising:
receiving the second control message comprising the indication of the set of reserved resources and reservation reassurance information based at least in part on a number of types of reservation reassurance information included in the second control message and a number of time and frequency resources for receiving the second control message, wherein the number of types of reservation reassurance information and the number of time and frequency resources are based at least in part on the format and the resource configuration.

20. The method of claim 19, wherein the types of the reservation reassurance information comprise one or more of a source identifier, a destination identifier, a reservation reassurance indication, a recommended resource indication, a sensing report, or a combination thereof.

21. The method of claim 19, wherein
the resources for communications by the first UE are based at least in part on the indication of the set of reserved resources and the reservation reassurance information.

22. The method of claim 15, further comprising:
transmitting data in available resources in a subchannel, wherein the available resources in the subchannel are nonoverlapping with time and frequency resources for the second control message indicated by the resource configuration.

23. A method for wireless communications at a first user equipment (UE), the method comprising:
transmitting a first control message comprising a first indication of a set of resources for sidelink communications with a second UE; and
performing a negotiation procedure with the second UE to identify a transmission occasion for resource reservation reassurance, the transmission occasion configured for transmission, by the second UE, of a second indication of the set of resources.

24. The method of claim 23, wherein the transmission occasion indicates a second set of resources in a subchannel for a second control message comprising the second indication of the set of resources.

25. The method of claim 24, further comprising:
performing sidelink communications using available resources in the subchannel, wherein the available resources in the subchannel are nonoverlapping with time and frequency resources for the second control message.

26. An apparatus for wireless communications at a first user equipment (UE), comprising:
a processor;
memory coupled with the processor; and
instructions stored in the memory and executable by the processor to cause the apparatus to:
receive, from a second UE, an indication of a set of reserved resources for sidelink communications between the first UE and the second UE;
transmit, based on receiving the indication of the set of reserved resources from the second UE, a first control message for reservation reassurance of the set of reserved resources, the first control message comprising an indication of a resource configuration for a second control message for reservation reassurance of the set of reserved resources; and
transmit the second control message based at least in part on the indication of the resource configuration, the second control message indicating the set of reserved resources for sidelink communications between the first UE and the second UE.

27. The apparatus of claim 26, wherein the instructions are further executable by the processor to cause the apparatus to:
transmit an indication of a format of the second control message in the first control message.

28. The apparatus of claim 27, wherein the instructions are further executable by the processor to cause the apparatus to:
transmit the indication of the format of the second control message in a first field of the first control message; and
transmit the indication of the resource configuration for the second control message in one or more other fields of the first control message.

29. The apparatus of claim 27, wherein:
the format of the second control message is a configured format for reservation reassurance;
the configured format is associated with one or more types of reservation reassurance information for the set of reserved resources; and
the resource configuration is based at least in part on a number of the one or more types of the reservation reassurance information.

30. The apparatus of claim 29, wherein the one or more types of the reservation reassurance information comprise a source identifier, a destination identifier, a reservation reassurance indication, a recommended resource indication, a sensing report, or a combination thereof.

* * * * *